(12) United States Patent
Nakamura

(10) Patent No.: US 9,181,822 B2
(45) Date of Patent: Nov. 10, 2015

(54) VARIABLY OPERATED VALVE SYSTEM FOR MULTI-CYLINDER INTERNAL COMBUSTION ENGINE AND CONTROL APPARATUS FOR VARIABLY OPERATED VALVE SYSTEM

(71) Applicant: HITACHI AUTOMOTIVE SYSTEMS, LTD., Hitachinaka-shi, Ibaraki (JP)

(72) Inventor: Makoto Nakamura, Zushi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 35 days.

(21) Appl. No.: 14/132,310

(22) Filed: Dec. 18, 2013

(65) Prior Publication Data

US 2014/0202406 A1     Jul. 24, 2014

(30) Foreign Application Priority Data

Jan. 21, 2013    (JP) ................................. 2013-007998

(51) Int. Cl.

| F01L 1/34 | (2006.01) |
|---|---|
| F01L 1/46 | (2006.01) |
| F01L 13/00 | (2006.01) |
| F02D 13/02 | (2006.01) |
| F01L 1/10 | (2006.01) |
| F01L 1/18 | (2006.01) |

(52) U.S. Cl.
CPC ............... *F01L 1/46* (2013.01); *F01L 13/0005* (2013.01); *F01L 13/0063* (2013.01); *F02D 13/023* (2013.01); *F02D 13/0257* (2013.01); *F01L 1/10* (2013.01); *F01L 1/185* (2013.01); *Y02T 10/18* (2013.01)

(58) Field of Classification Search
CPC ..... F01L 1/46; F01L 13/0063; F01L 13/0005; F02D 13/0257; F02D 13/023
USPC .................................. 123/90.52, 90.59, 90.16
See application file for complete search history.

(56) References Cited

U.S. PATENT DOCUMENTS

| 6,578,535 B2 * | 6/2003 | Spath et al. ................. 123/90.16 |
| 7,403,849 B1 * | 7/2008 | Watanabe et al. ............. 701/102 |
| 7,712,443 B2 | 5/2010 | Gemein |
| 8,401,721 B2 | 3/2013 | Nakamura et al. |

(Continued)

FOREIGN PATENT DOCUMENTS

| JP | 63-016112 A | 1/1988 |
| JP | 2007-100585 A | 4/2007 |

(Continued)

*Primary Examiner* — Zelalem Eshete
(74) *Attorney, Agent, or Firm* — Foley & Lardner LLP

(57) ABSTRACT

In a variably operated valve system for a multi-cylinder internal combustion engine and a control apparatus for the variably operated valve system, a first valve stop mechanism is configured to switch between a valve operation state in which one of a pair of intake valves from among the pair of intake valves of a part of a plurality of cylinders is operated to be open or closed and a valve stopped state in which the valve open or closure operation of the one of the intake valves is stopped, a second valve stop mechanism is configured to switch between the valve operation state in which the other of the pair of intake valves from among the pair of intake valves of the part of the cylinders is operated to be open or closed and the valve stopped state in which the valve open or closure operation is stopped.

20 Claims, 18 Drawing Sheets

(56) References Cited

U.S. PATENT DOCUMENTS

| | | | |
|---|---|---|---|
| 2006/0144356 A1* | 7/2006 | Sellnau et al. | 123/90.16 |
| 2008/0245326 A1 | 10/2008 | Gemein | |
| 2011/0137504 A1 | 6/2011 | Nakamura et al. | |

FOREIGN PATENT DOCUMENTS

| | | |
|---|---|---|
| JP | 2009-503345 A | 1/2009 |
| JP | 2010-270633 A | 12/2010 |
| JP | 2011-117399 A | 6/2011 |

* cited by examiner

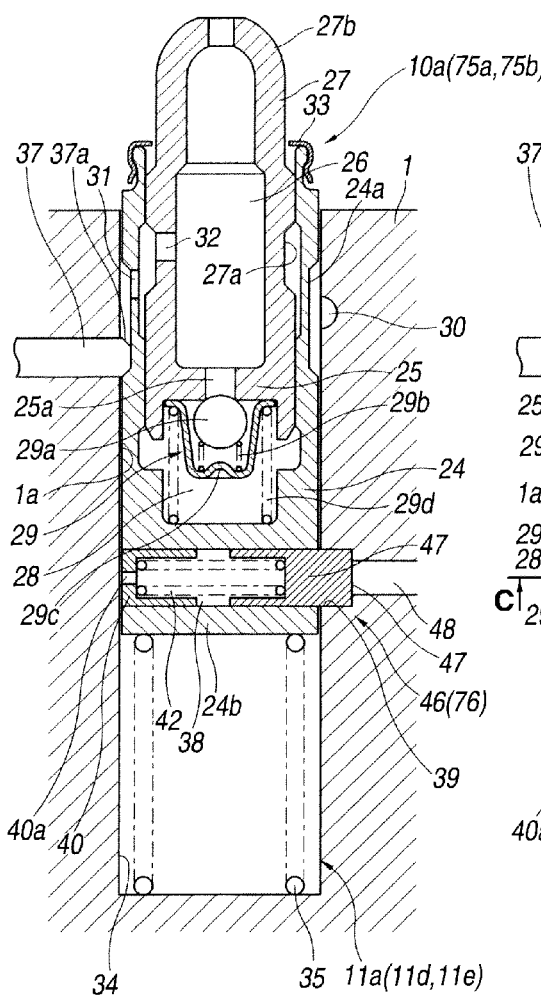
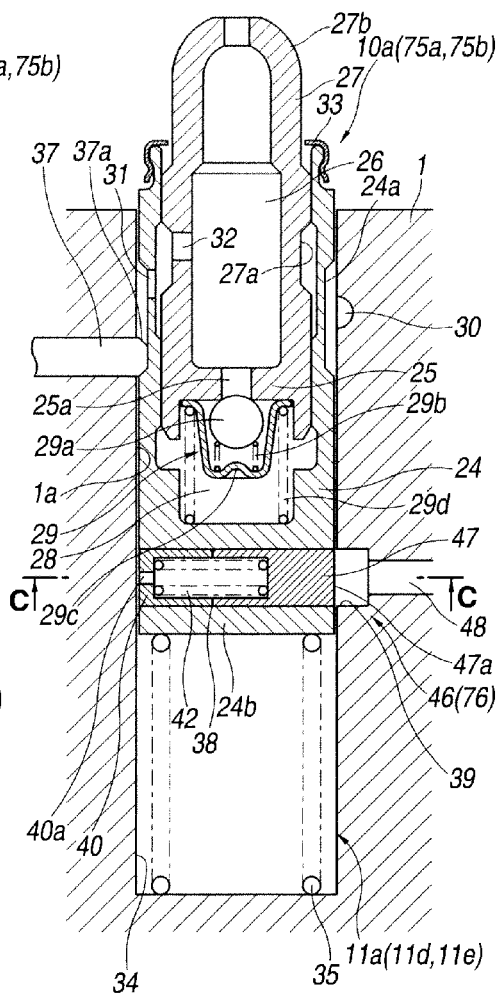
FIG.5A
FIG.5B
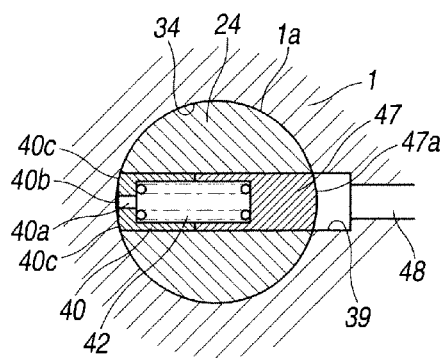
FIG.5C

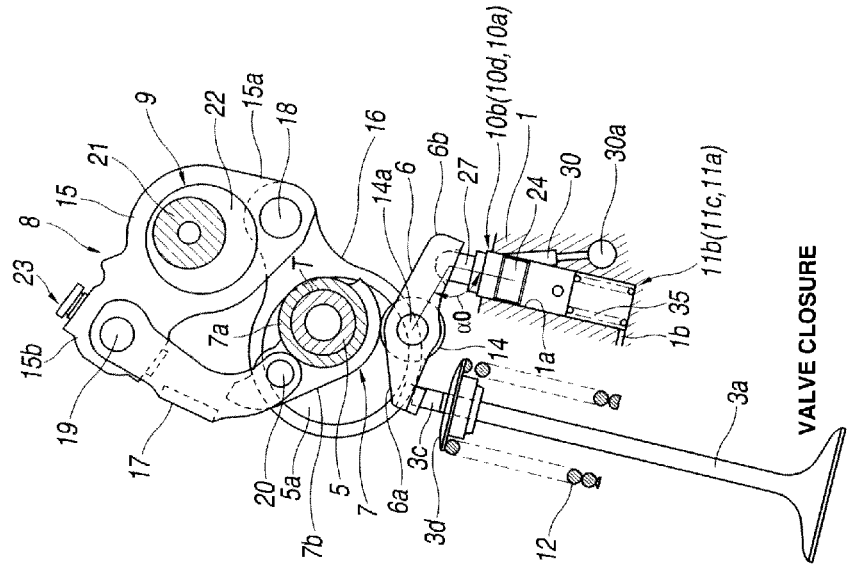
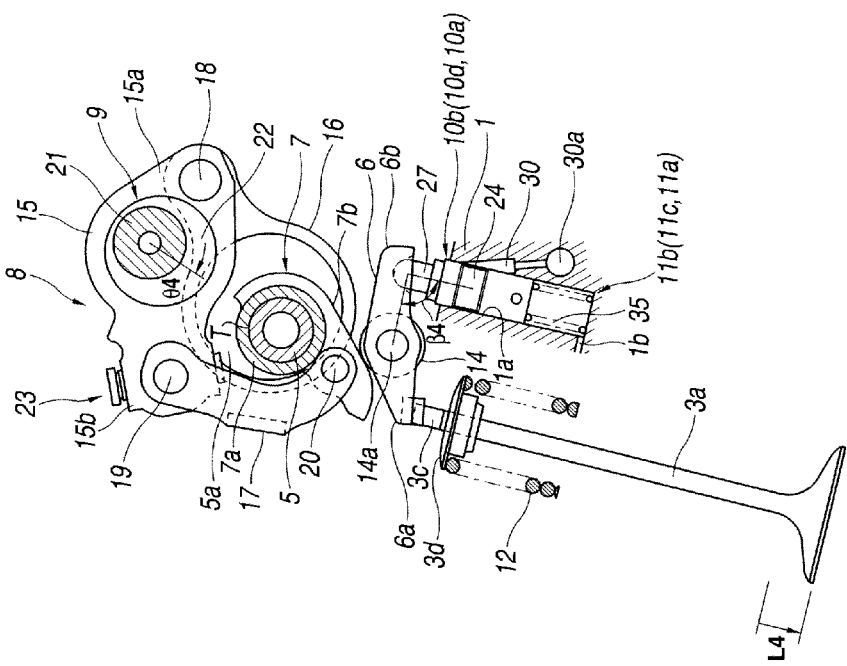

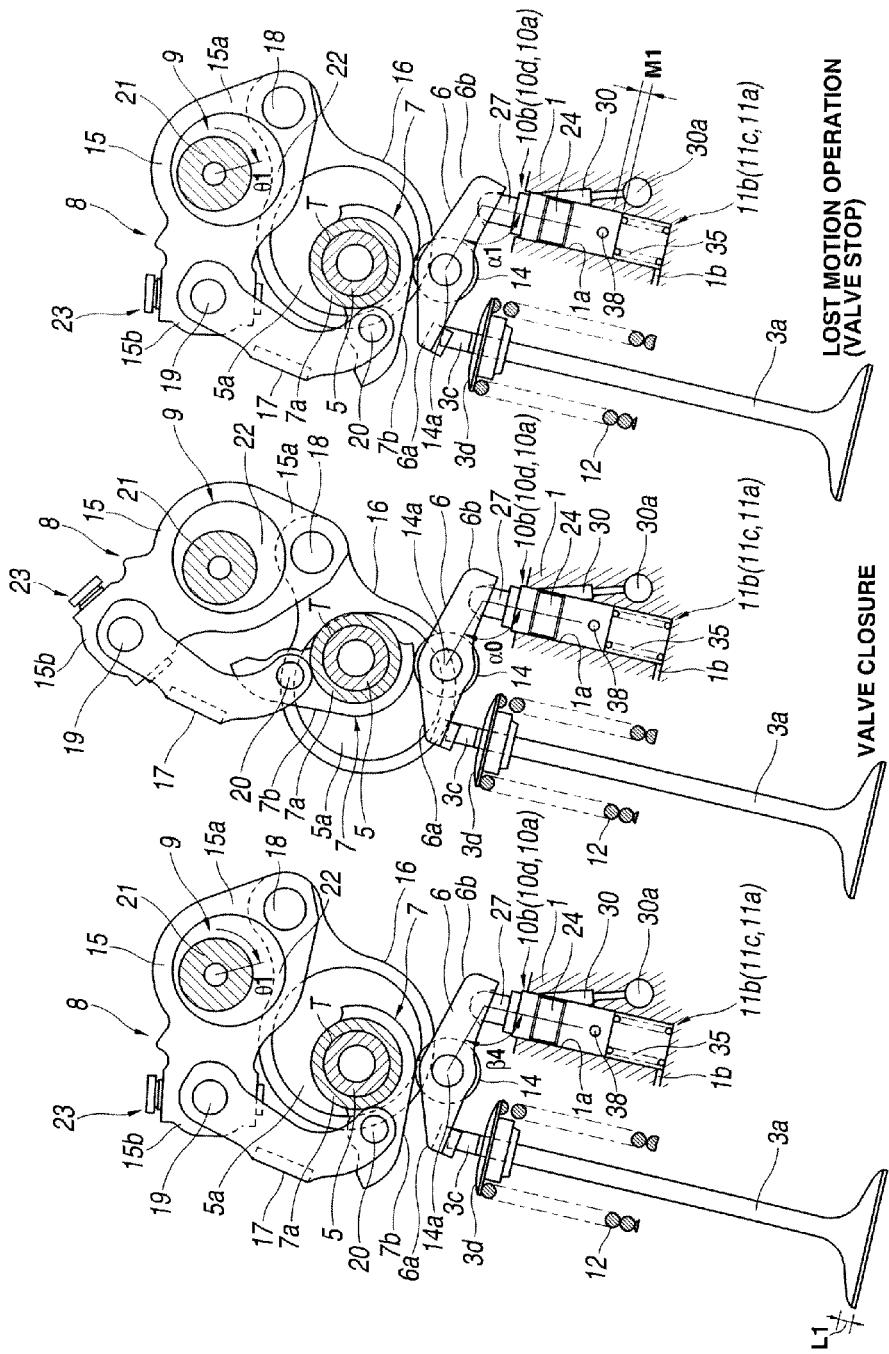

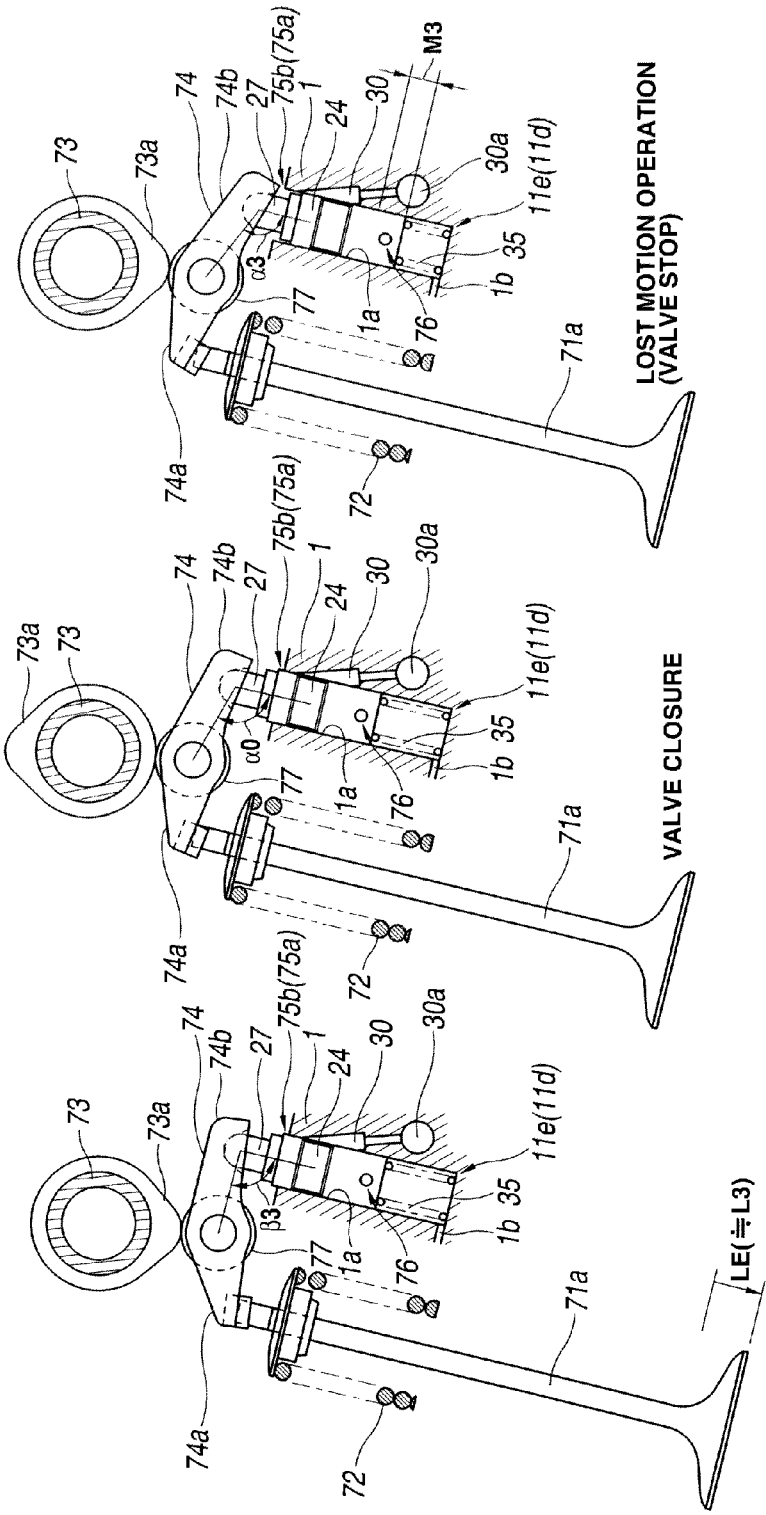

FIG.14

VARIABLY OPERATED VALVE SYSTEM FOR MULTI-CYLINDER INTERNAL COMBUSTION ENGINE AND CONTROL APPARATUS FOR VARIABLY OPERATED VALVE SYSTEM

BACKGROUND OF THE INVENTION (1) Field of the Invention

The present invention relates to a variably operated valve system for a multi-cylinder internal combustion engine and a control apparatus for the variably operated valve system which are capably of stopping valve open-or-closure operations of intake valves and exhaust valve(s) in accordance with an engine driving state.

(2) Description of Related Art

A Japanese Patent Application First Publication (tokkai) No. 2007-100585 published on Apr. 19, 2007 exemplifies a previously proposed variably operated valve system for a multi-cylinder internal combustion engine.

This variably operated valve system is provided with a valve stop (pause) mechanism which stops (pauses) a valve open-or-closure operations of each of or a pair of intake valves and each or single exhaust valve of a part of a plurality of cylinders and a body of a lash adjuster is fixed to a cylinder head by means of a switching member in a high-speed rotation driving demanding a high output of the engine. Hence, since this lash adjuster functions as a normal lash adjuster, when a rocker arm is pushed down by means of cams, one end section of a rocker arm is swung as a swing fulcrum and the other end of the rocker arm actuates the intake valves and exhaust valves respectively by predetermined lift quantities.

On the other hand, in a common use driving area demanding a low fuel consumption, the switching member is moved in the body of the lash adjuster to make the rash adjuster lost motion to stop the operations of the intake valves and exhaust valves in a part of the cylinders. Thus, a combustion drive by only the remaining cylinder(s), namely, so called, a reduced cylinder drive is performed. Consequently, the fuel consumption (or fuel efficiency) becomes improved.

SUMMARY OF THE INVENTION

However, in the previously proposed variably operated valve system, during a start of the engine, in order to secure an engine torque, all of the intake valves and exhaust valves are in the valve open-or-closure drive is (valve operations) with all cylinders driven without a pause (stop) of the cylinders. A startability of the engine is not always improved by these all cylinders (drive) operations.

In addition, when the engine driving state enters a predetermined practical driving area, a part of the cylinders is transferred to a pause (stopped) state. However, in this case, all of the intake valves and the exhaust valves in the (stopped) paused cylinders are in the halt (stopped) state together.

That is to say, it is necessary to move a switching member corresponding to all of the intake valves and exhaust valves of the part of cylinders simultaneously.

Hence, a technical problem such that a rise characteristic of the supplied hydraulic pressure is reduced and a switching response characteristic to the stopped cylinders is worsened is raised. For example, during an acceleration process, an influence of a smoothness of acceleration and an influence of the response are raised.

It is, with the above-described technical problem of the previously proposed variably operated valve system in mind, an object of the present invention to provide an improved variably operated valve system for a multi-cylinder internal combustion engine and an improved control apparatus of the variably operated valve system which can obtain a favorable startability of the engine by a reduction in an engine friction and an improvement in a fuel combustion due to a generation of a strong intake swirl at the time of the engine start and can improve a switching response characteristic when the engine is switched to a cylinder pause (stop) mode (state).

According to one aspect of the present invention, there is provided a variably operated valve system for a multi-cylinder internal combustion engine, the internal combustion engine having a plurality of cylinders, comprising: a pair of intake valves and a pair of or a single exhaust valve disposed for each of the cylinders; a first valve stop mechanism configured to switch between a valve operation state in which one of the pair of intake valves from among the pair of intake valves of a part of the cylinders is operated to be open or closed and a valve stopped state in which the valve open-or-closure operation of the one of the pair of intake valves is stopped; and a second valve stop mechanism configured to switch between the valve operation state in which the other of the pair of intake valves from among the pair of intake valves of the part of the cylinders is operated to be open or closed and the valve stopped state in which the valve open-or-closure operation is stopped, wherein the first valve stop mechanism is configured to be in the valve operation state when a switching energy is supplied and to be in the valve stopped state when the supply of the switching energy is stopped and the second valve stop mechanism is configured to be in the valve stopped state when the switching energy is supplied and to be in the valve operation state when the supply of the switching energy is stopped.

According to another aspect of the present invention, there is provided a variably operated valve system for a multi-cylinder internal combustion engine, the internal combustion engine having a plurality of cylinders, comprising: a pair of intake valves and a pair of or a single exhaust valve disposed for each of the cylinders; swing arms configured to swing with lash adjusters as swing fulcrums to actuate the pair of intake valves and the pair of or single exhaust valve to perform open-or-closure operations; a first valve stop mechanism actuated by means of a hydraulic pressure to make a swing quantity of one of the swing arms corresponding to one of the pair of intake valves of a part of the cylinders from among the plurality of cylinders a lost motion to be in a valve stopped state; and a second valve stop mechanism actuated by means of the hydraulic pressure to make the swing quantity of another of the swing arms corresponding to the other of the pair of intake valves of the part of the cylinders from among the plurality of cylinders the lost motion to be in the valve stopped state, wherein the first valve stop mechanism is configured to be in a valve operation state when a hydraulic pressure is supplied and to be in the valve stopped state when the supply of the hydraulic pressure is limited and the second valve stop mechanism is configured to be in the valve stopped state when the hydraulic pressure is supplied and to be in the valve operation state when the supply of the hydraulic pressure is limited.

According to a still another aspect of the present invention, there is provided a control apparatus of a variably operated valve system for a multi-cylinder internal combustion engine, comprising: a pair of intake valves and a pair of or a single exhaust valve respectively disposed for each of the cylinders; a first valve stop mechanism configured to switch between a valve operation state in which one of the pair of intake valves from among the pair of intake valves of a part of the cylinders is operated to be open or closed and a valve stopped state in which a valve open-or-closure operation is stopped; and a second valve stop mechanism configured to switch between the valve operation state in which the other of the pair of intake valves from among the pair of intake valves of the part of the cylinders is operated to be open or closed and the valve stop state in which the valve open-or-closure operation of the other of the pair of intake valves is stopped, wherein the first valve stop mechanism is configured to operate the one of the pair of intake valves when a switching energy is supplied and to stop the valve open-or-closure operation of the one of the pair of intake valves when a supply of a switching energy is carried out, the second valve stop mechanism is configured to stop the operation of the other of the pair of intake valves when the supply of the switching energy is stopped, and the supply of the switching energy to the first valve stop mechanism and to the second valve stop mechanism is separately controlled.

BRIEF DESCRIPTION OF THE DRAWINGS

FIGS. 5A, 5B, and 5C are a longitudinal cross sectional view representing a second (third) valve stop mechanism applicable to the intake valve side (an exhaust valve side) of the first embodiment, a longitudinal cross sectional view representing an action of the second (third) valve stop mechanism, a cross sectional view of the second (third) valve stop mechanism cut away along a line of C to C in FIG. 5B, respectively.

FIGS. 9A and 9B are an explanatory view of an action when the intake valve in which the valve stop mechanism in the first embodiment is provided is controlled to be a maximum lift quantity (L4) and are an explanatory view of an action when the same intake valve is closed.

FIG. 11A is an explanatory view of the action of the intake valve which is open when the intake valve in which the valve stop mechanism in the first embodiment is provided is controlled to be a minimum lift quantity (L1), FIG. 11B is an explanatory view of the action of each of the intake valves which is closed when the same intake valve is closed, and FIG. 11C is an explanatory view of the action of a lost motion by means of the valve stop mechanism.

FIGS. 12A, 12B, and 12C are explanatory views of operation states of an exhaust valve at a first cylinder (#1) side, FIG. 12A representing a peak lift state when an open exhaust valve lift quantity indicates LE, FIG. 12B representing an explanatory view of a state of the exhaust valve when it is closed, and FIG. 12C representing an action of a lost motion by means of the valve stop mechanism.

FIG. 14 is a graph representing valve lift characteristics of the intake and exhaust valves of first and second cylinders (#1) and (#2) and throttle valve opening angle characteristics during a switching transfer among driving regions (1) through (8) shown in FIG. 13.

DETAILED DESCRIPTION OF THE INVENTION

Hereinafter, preferred embodiments of a variably operated valve system for a multi-cylinder internal combustion engine according to the present invention will be described on a basis of the attached drawings.

Each of the preferred embodiments can apply, according to the present invention, to a series 2 (two) cylinder gasoline specified internal combustion engine.

[First Embodiment]

Figure 1:
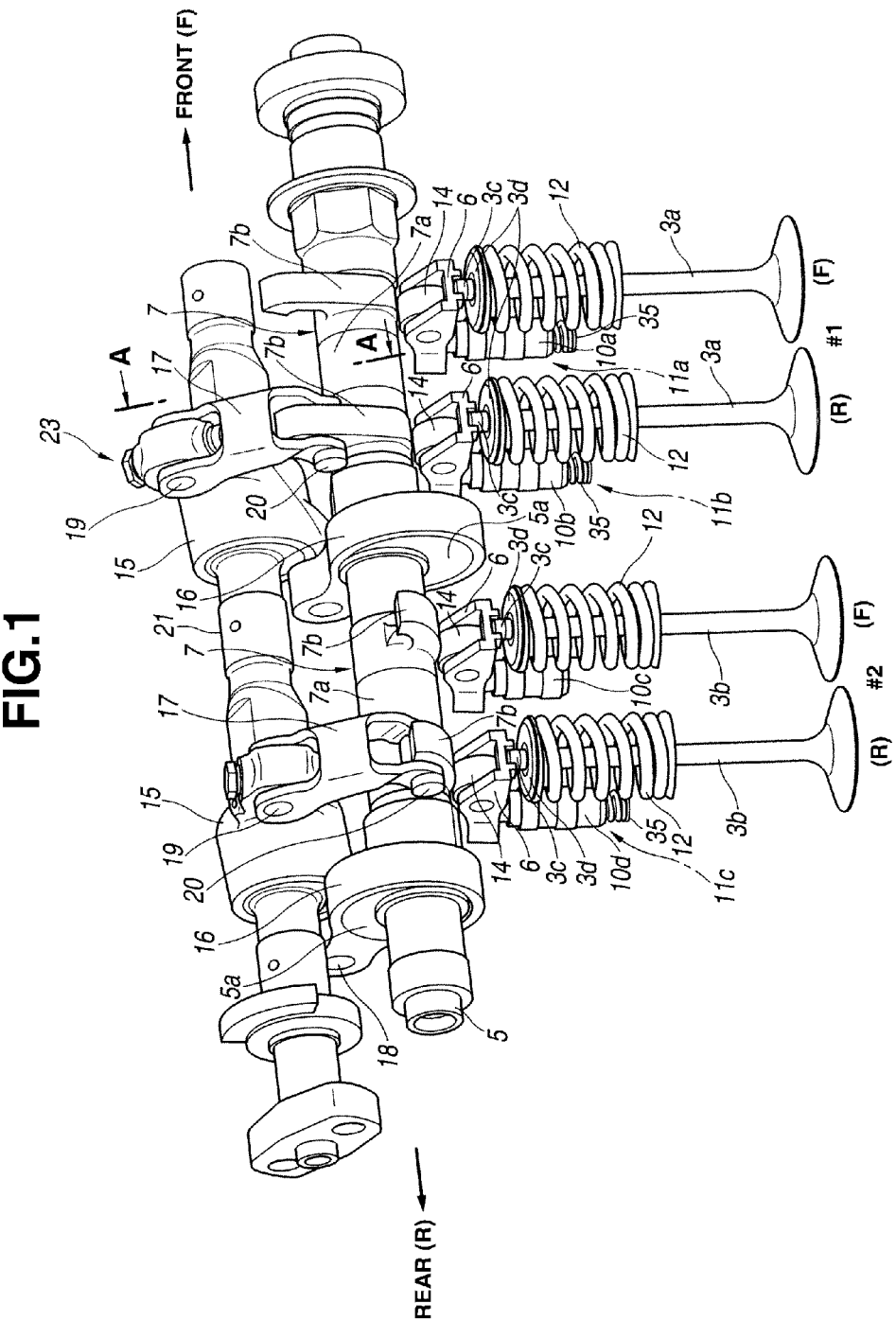
FIG. 1 is a perspective view of an intake valve side representing a first preferred embodiment of a variably operated valve system according to the present invention applicable to a two-cylinder internal combustion engine.

FIG. 1 shows a variably operated valve system at an intake (valve) side of first and second cylinders #1 and #2.

Figure 2:
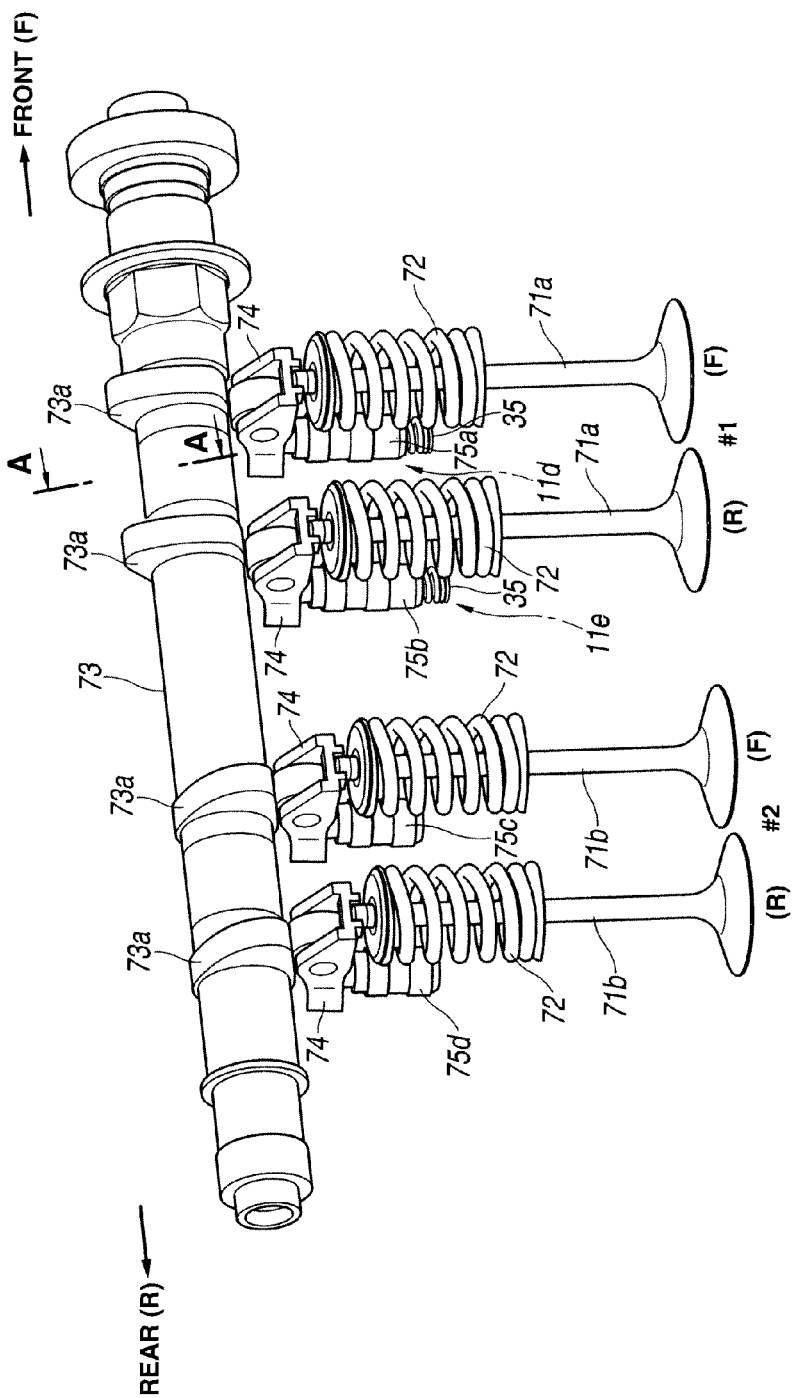
FIG. 2 is a perspective view of an exhaust valve side representing the first embodiment of the variably operated valve system shown in FIG. 1.

FIG. 2 shows the variably operated valve system at an exhaust (valve) side of first and second cylinders #1 and #2. It should be noted that first cylinder #1 at a front side (F) shown in FIGS. 1 and 2 is a cylinder capable of pausing (stoppable) cylinder (operation), namely, capable of stopping a valve open-or-closure operation of all intake valves and exhaust valves of first cylinder (#1) but second cylinder #2 at a rear side (R) is not stopped but is capable of always working (operating) cylinder (at all times) in which valve stop (intake valve stop) of only the other of the intake valves located at the rear (R) side. It should be noted that, in this embodiment, only the intake valve at rear (R) side of always working second cylinder #2 is capably of stopping the valve operation.

Figure 3:
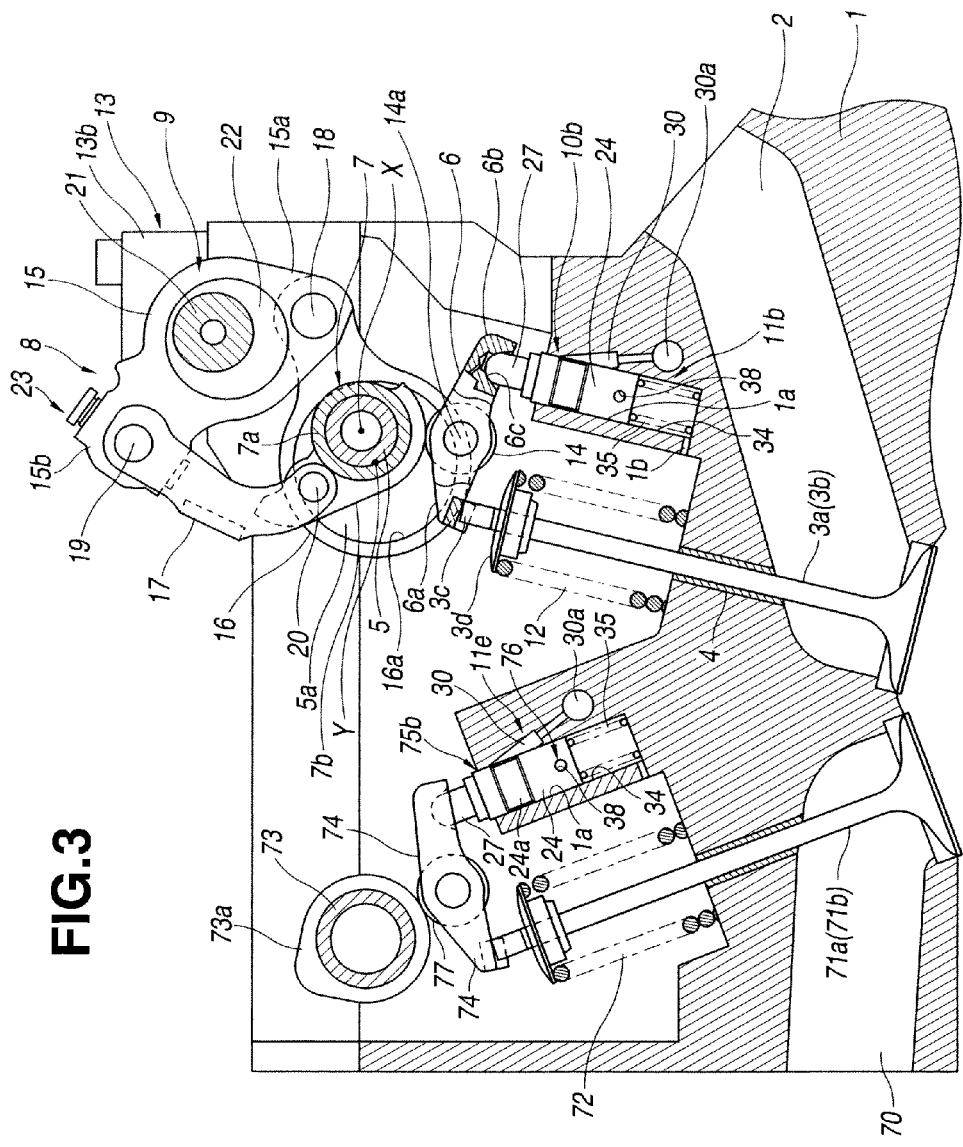
FIG. 3 is a cross sectional view of the variably operated valve system cut away along a line A to A in FIGS. 1 and 2.

In addition, FIG. 3 shows the variably operated system at the intake side and the exhaust side in first cylinder (#1: cylinder capable of stopping the valve operation).

[Variably Operated Valve System at the Intake Side]

A specific structure of a variably operated valve mechanism at the intake side of first and second cylinders (#1, #2) will be described later.

As shown in FIGS. 1 and 3, a pair of intake valves per cylinder (which open and close a pair of intake ports 2, 2 formed in a cylinder head 1) are disposed. That is to say, first and second intake valves 3a, 3a and first and second intake valves 3b, 3b are disposed, respectively, in first and second cylinders #1 and #2. It should be noted that, in each cylinder, first intake valves 3a, 3b are arranged at the F side and second intake valves 3a, 3b are arranged at the R side, respectively.

A variable lift mechanism disposed within respective first and second intake valves 3a, 3b, as shown in FIGS. 1 and 3 includes: a drive shaft 5 arranged along an engine forward/backward direction at a vertical side of each cylinder and having two drive cams 5a on an outer periphery of drive shaft 5; a pair of swing cams 7, 7 having cam surfaces 7b, 7b and valve open-or-closure operation for respective intake valves 3a, 3b; a transmission mechanism 8 converting a rotational force of each drive cam 5a into a swing force and transmitting the swing force to each swing cam 7; and a control mechanism 9 which controls a working angle (valve open interval) of each intake valve 3a, 3a, 3b, 3b and a lift quantity of each intake valve 3a, 3a, 3b, 3b.

Four of first, second, third, and fourth hydraulic pressure lash adjusters 10a, 10b, 10c, 10d (refer to FIG. 1) are disposed which are fulcrum members (pivots) which adjust gaps between each intake valve 3a, 3b and each swing arm 6 and gaps between base circles of each cam surface 7b of each swing cam 7 to be zero lash.

In other words, first and second hydraulic pressure lash adjusters 10a, 10b are disposed at the intake (valve) side of first cylinder #1 and third and fourth hydraulic pressure lash adjusters 10c, 10d are disposed at the intake (valve) side of second cylinder #2, as appreciated from FIG. 1.

It should, herein, be noted that first hydraulic pressure lash adjuster 10a is disposed at F (Front) side of first cylinder #1, second hydraulic pressure lash adjuster 10b is disposed at R (Rear) side of first cylinder #1, third hydraulic pressure lash adjuster 10c is disposed at the F (Front) side of second cylinder #2, and fourth hydraulic pressure lash adjuster 10d is disposed at the R side of second cylinder #2, as shown in FIG. 1.

Furthermore, first and second valve stop mechanisms (lost motion mechanisms) 11a, 11b which stop valve open-or-closure operations of first and second intake valves 3a, 3a of first cylinder #1 via first and second hydraulic pressure lash adjusters 10a, 10b at first cylinder side #1 in accordance with an engine driving state are disposed at first and second intake valves 3a, 3a of first cylinder #1.

In addition, another first valve stop mechanism 11c (lost motion mechanism) is disposed which stops the open-or-closure operation of second intake valve 3b via fourth lash adjuster 10d at the R side of second cylinder #2.

It should be noted that an intake (valve) side variable lift mechanism constituted by above-described drive shaft 5, swing cam 7, transmission mechanism 8, and control mechanism 9 is, hereinafter, called an intake VEL (valve event and lift varying mechanism).

In addition, a phase modification type valve timing control apparatus (intake VTC (valve timing control)) which varies an open-or-closure timing of respective intake valves 3a, 3a, 3b, 3b is installed at a terminal section of F side drive shaft 5. This intake VTC may be an ordinary type of VTC which performs a phase conversion of the intake valve through a hydraulic pressure of a vane rotor (not shown).

Hereinafter, respective constituent (structural) members at first and second cylinders #1 and #2 will be described below. Four intake valves 3a, 3a, 3b, 3b are slidably held on cylinder head 1 via respectively corresponding valve guides 4, as shown in FIG. 3. Four intake valves 3a, 3b are biased in the closure direction by means of respective valve springs 12 elastically contacted between respective spring retainers 3d, 3d, 3d, 3d installed in the vicinity to respective stem ends 3c and an upper surface of an inside of cylinder head 1 (refer to FIGS. 3)

Above-described drive shaft 5 is rotatably supported on a plurality of bearing sections 13 disposed at an upper end section of cylinder head 1 via a cam shaft 7a of swing cam 7 and a rotational force of a crankshaft is transmitted to drive shaft 5 via a timing pulley disposed on a housing (not shown) of intake VTC described above disposed on one end section of cylinder head 1. Single drive cam 5a disposed per cylinder has an axial center Y eccentric toward a radial direction from axial center X of drive shaft 5 and a cam profile of the outer periphery of drive cam 5a is formed circularly.

Each swing arm 6 has one end section 6a whose flat shaped or slightly convex shaped lower surface is contacted on each stem end 3c of intake valves 3a, 3b. On the other hand, a lower surface recess section 6c of other end section 6b of each swing arm 6 is contacted on a head section of each hydraulic pressure lash adjuster 10a through 10d. A roller 14 is rotatably housed within a housing hole formed at a center of each swing arm 6 via a roller axle 14a.

Each swing cam 7, as shown in FIGS. 1 and 3, is formed with cam surface 7b having the lower surface comprising a base circle surface, a ramp surface, and a lift surface at respective end sections of a cylindrical shape and the base circle surface, the ramp surface, and lift surface are rollably contacted on an upper surface of roller 14 of swing arm 6 in accordance with a swing position of swing cam 7.

Camshaft 7a has a journal section formed at a substantial center position in the axial direction formed on the outer peripheral surface rotatably supported on a plurality of bearing sections 13 with a minute clearance and the outer peripheral surface of drive shaft 5 is rotatably supported on the inner peripheral surface.

Each transmission mechanism 8 includes: a rocker arm 15 disposed on an upper position of drive shaft 5; a link arm 16 interlinking between one end section 15a of rocker arm 15 and drive cam 5a; and a link rod 17 is interlinking between other end section 15b of rocker arm 15 and single swing cam 7.

Rocker arm 15 has a cylindrical base section at a center section of rocker arm 15 rotatably supported on a control cam as will be described later via a supporting hole. Rocker arm 15 has one end section 15a rotatably linked to link arm 16 via a pin 18 and other end section 15b rotatably linked to an upper end section of link rod 17.

A cam main body of drive cam 5a is rotatably fitted into a fitting hole 16a located at the center position of an annular base section of link arm 16. A projection end of link arm 16 is linked to rocker arm one end section 15a by means of pin 18.

Link rod 17 has a lower end section rotatably linked to a cam nose section on which one cam surface of swing cam 7 is formed via pin 20.

It should be noted that an adjustment mechanism 23 which minutely adjusts the lift quantities of respective lift quantities of respective intake valves 3a, 3b during an assembly of respective constituent components are interposed between other end sections of respective rocker arms 15 and the upper end section of link rod 17.

A control shaft 21 rotatably supported via the same bearing section on the upper position of drive shaft 5 and two control cams 22 (which serve as swing fulcrums of respective rocker arms 15) slidably fitted into the supporting holes of rocker arms 15 and fixed to the outer periphery of drive shaft 5 are fixed to control mechanism 9.

Figure 7:
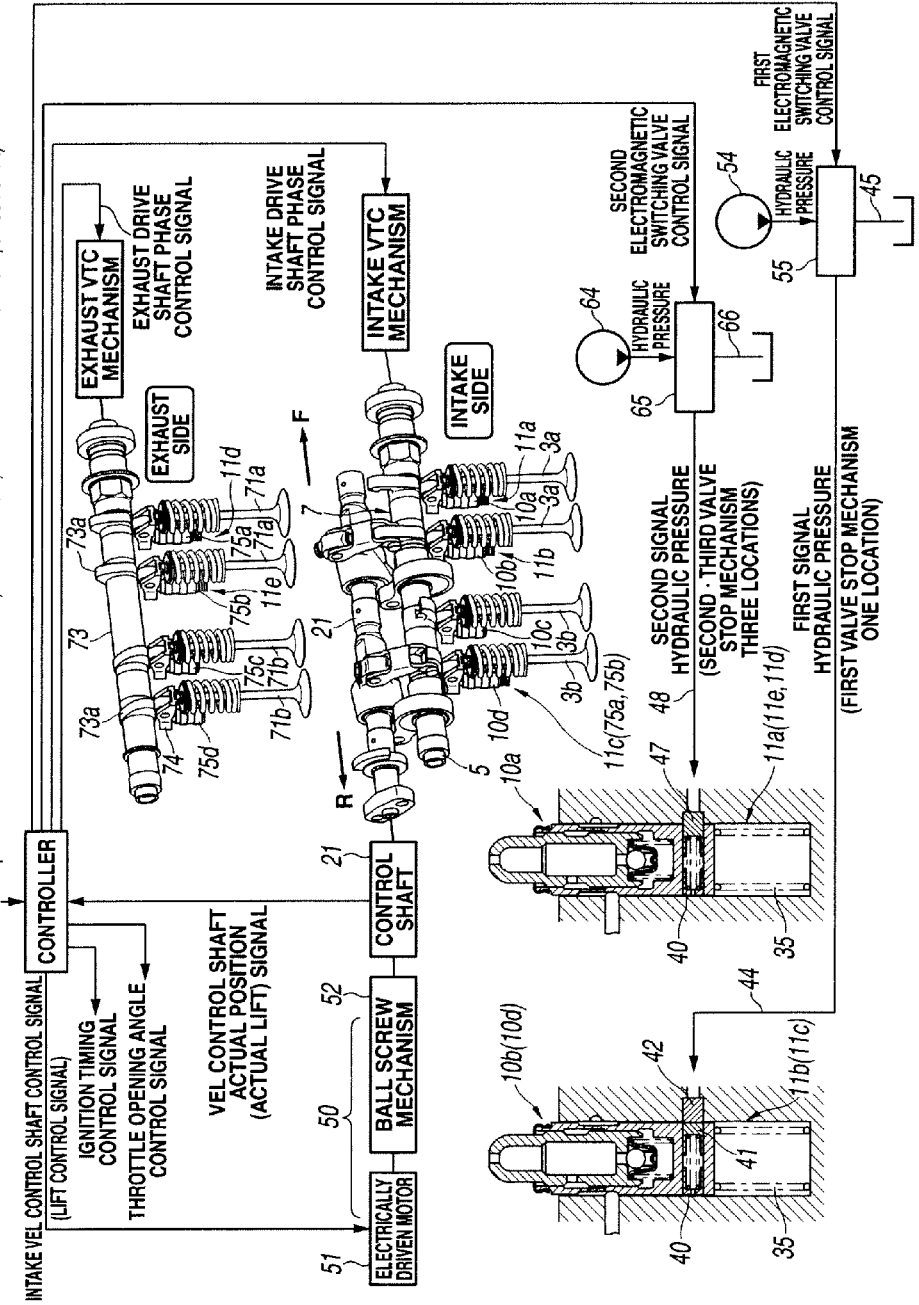
FIG. 7 is a rough view representing a control hydraulic pressure circuit in the first preferred embodiment shown in FIG. 1.

Control shaft 21 is disposed in the forward-or-backward direction of the engine in parallel to drive shaft 5 and, as shown in FIG. 7, is rotatably controlled by means of an actuator 50. On the other hand, each of control cams 22 is formed in a cylindrical shape and has an axial center position offset from an axial center of control axle 21 by a predetermined distance.

Actuator 50 is, as shown in FIG. 7, includes: an electrically driven motor 51 fixed to one end section of the housing (not shown); and a ball screw mechanism 52 including a ball screw element and a conversion link as a speed reduction mechanism disposed in the inside of housing to transmit a rotational driving force of electrically driven motor 51 to control shaft 21.

Electrically driven motor 51 is constituted by a proportional type DC motor and is normally or reversely rotationally controlled according to a control signal from a controller (control unit) 53 detecting the engine driving state.

Each of four hydraulic pressure lash adjusters 10a, 10b, 10c, 10d includes: as shown in FIGS. 4A through 6, a bottomed cylindrical body 24 held respectively within respective retaining holes 1a in the cylindrical shape of cylinder head 1; a plunger 27 vertically slidably formed within a lower section of body 24, constituting a reservoir chamber 26 within an inside of an integrally formed partitioning wall 25 at a lower section of plunger 27; a high pressure chamber 28 communicated with reservoir chamber 26 via a communication hole 25a penetrated and formed within partitioning wall 25; and a check valve 29 allowing a flow-in only through the direction of high pressure chamber 28. In addition, an exhaust hole 1b which exhausts working oil reserved within retaining hole 1a to an external is formed in an inside of cylinder head 1 (refer to FIG. 6).

Body 24 is formed with a cylindrical first recess groove 24a on an outer peripheral surface of body 24 and a first passage hole 31 is penetrated in a radial direction communicating between oil passage 30 opened to first recess groove 24a and the inside of cylinder head 1.

Figure 6:
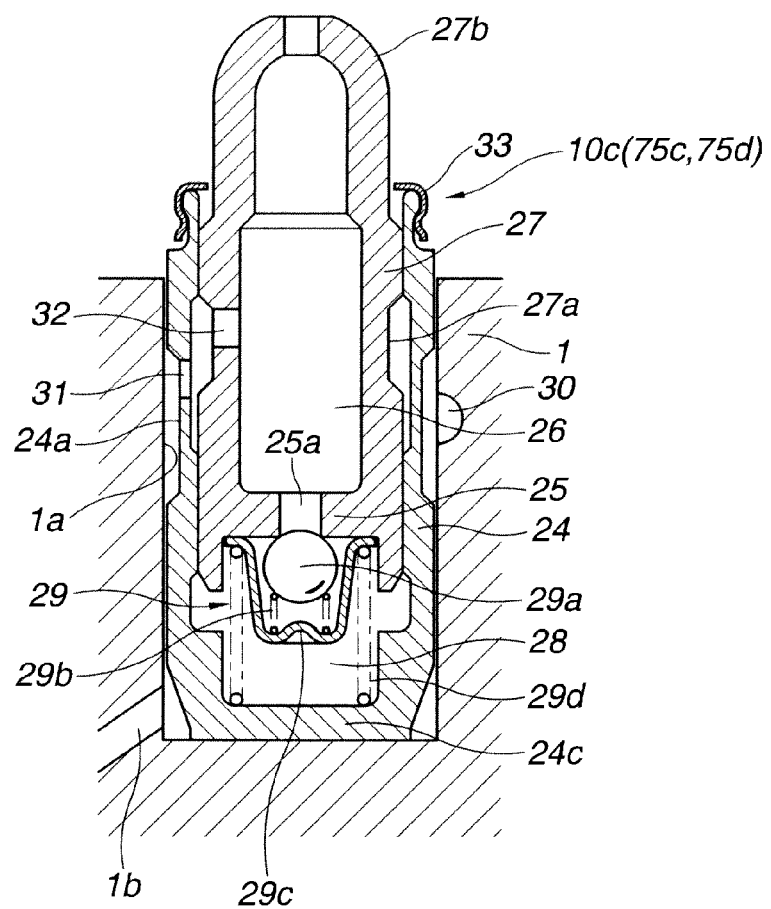
FIG. 6 is a longitudinal cross sectional view of a hydraulic pressure lash adjuster in which the valve stop mechanism is not equipped in the preferred embodiment according to the present invention.

In addition, each body 24 of first and second hydraulic pressure lash adjusters 10a, 10b (F, R side) and fourth hydraulic pressure lash adjuster 10d (R side) of second cylinder #2 are extended in a lower direction than bottom section 24c of body 24 of third hydraulic pressure lash adjuster 10c (F side) at second cylinder side #2 in which the valve stop mechanism shown in FIG. 6 is not installed and formed in a substantially column shape.

Oil passage 30 is, as shown in FIG. 3, communicated with a main oil gallery 30a for lubricating oil supply purpose formed within cylinder head 1 and the lubricating oil is supplied under pressure from oil pumps 54 or 64 shown in FIG. 7.

Plunger 27 is, as shown in FIGS. 4A through 6, formed with a cylindrical second recess groove 27a at an outer peripheral surface at a substantial center outer peripheral surface in the axial direction.

A second passage hole 32 is penetrated along the radial direction which communicates with first passage hole 31 and reservoir chamber 26. The tip surface of a tip head surface of each plunger 27 is formed in a spherical shape to secure a favorable slidability on a lower surface recess section 6c in a spherical shape of other end section 6b of each swing arm 6.

It should be noted that each plunger 27 has its maximum projection quantity limited by means of an annular stopper member 33 fitted and fixed to an upper end section of body 24.

Second recess groove 27a has its axial width relatively largely formed so that both of first passage hole 31 and second passage hole 32 are, at all times, communicated with each other even at either the upper or lower slidable positions of plunger 27 with respect to body 24.

Each check valve 29 includes: a check ball 29a open or closing a lower part opening edge (sheet) of a communication hole 25a; a first coil spring 29b biasing check ball 29a toward the closure direction; a cup shaped retainer 29c holding first coil spring 29b; and a second coil spring 29d elastically disposed between an inner bottom surface of bottom wall 24c of body 24 and an annular upper end section of retainer 29c to bias a whole of plunger 27 while retainer 29c to the upward direction while biasing retainer 29c toward the direction of partitioning wall 25.

In addition, when, at the base circle interval of cam surface 7b of swing cam 7, the pressure within high pressure chamber 28 becomes low due to an advance movement (vertical movement) of plunger 27 by means of a biasing force of second coil spring 29d, the working oil supplied from oil passage 30 within retaining hole 1a is caused to flow from first recess groove 24a via first passage hole 31, second recess groove 27a, and second passage hole 32 to reservoir chamber 26, and pushes and opens check ball 29a against a spring force of first coil spring 29b so that the working oil is caused to flow into high pressure chamber 28.

Thus, plunger 27 presses other end section 6b of swing arm 6 in the upward direction so that gaps between swing cam 7 and one end section 6a of swing arm 6 and a stem end 3a of each intake valve 3 (3a, 3b) are adjusted to give a zero lash.

Then, at a lift interval of swing cam 7, a lower weight is acted upon plunger 27. Hence, the hydraulic pressure within high pressure chamber 28 is raised and oil within high pressure chamber 28 is leaked from an interval between plunger 27 and body 24 so that plunger 27 is slightly dropped (leak down).

Again, at the base circle interval of cam surface 7b of swing cam 7, as described above, the gaps between the respective parts described above are adjusted to be zero lash due to the advance movement (vertical movement) of plunger by means of the biasing force of second coil spring 29d.

Such a lash adjustment function as described above is provided in all of first, second, third, and fourth hydraulic pressure lash adjusters 10a, 10b, 10c, 10d.

Mechanisms 11a, 11b, and 11c which are the lost motion mechanisms (second and first valve stop mechanisms) are disposed only on first and second hydraulic pressure lash adjusters 10a, 10b at the F side and R side of first cylinder #1 and on fourth hydraulic pressure lash adjuster 10d at the R side of second cylinder #2. As shown in FIG. 6, the lost motion mechanism is not disposed in third hydraulic pressure adjuster 10c at the F side of second cylinder #2.

That is to say, first valve stop mechanisms 11b, 11c at second and fourth hydraulic pressure lash adjusters 10b, 10d at respective R sides of first and second cylinders #1 and #2 and second valve stop mechanism 11a at first hydraulic pressure lash adjuster side 10a at the F side of first cylinder #1. As described hereinabove, the valve stop and the valve operation are switched in accordance with the engine driving state as will be described later. However, the valve stop mechanism at the F side of second cylinder #2 is not disposed. Hence, an ordinary pivot function and zero lash adjustment function are provided at the F side of second cylinder #2.

In addition, a part of structures (a limitation mechanism) of first valve stop mechanisms 11b, 11c and second valve stop mechanism 11a are different from each other as shown in FIGS. 4A through 5C.

Figure 4A:
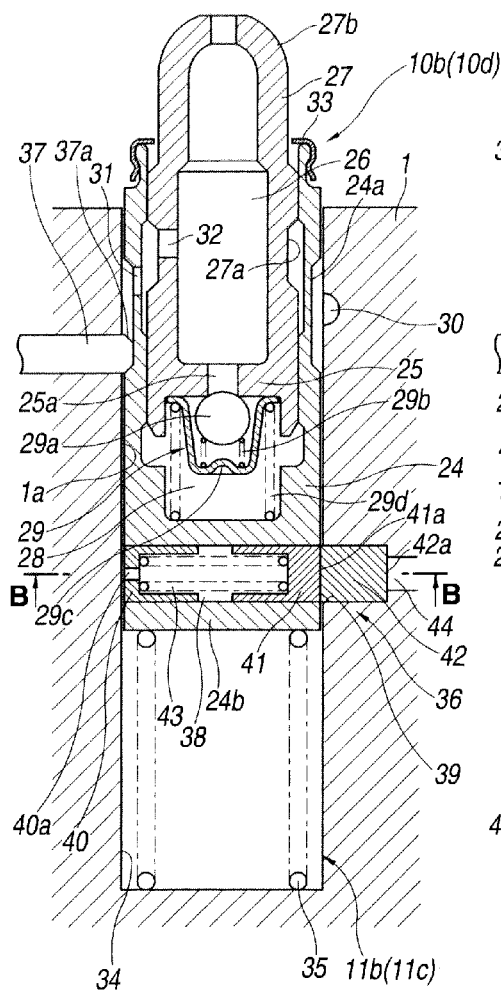
FIGS. 4A, 4B, and 4C are a longitudinal cross sectional view representing a first valve stop mechanism applicable to the intake valve side in the first preferred embodiment, a longitudinal cross sectional view representing an action of the first valve stop mechanism, and a cross sectional view of the first valve stop mechanism shown in FIG. 4A cut away along a line of B to B in FIG. 4A, respectively.
Figure 4B:
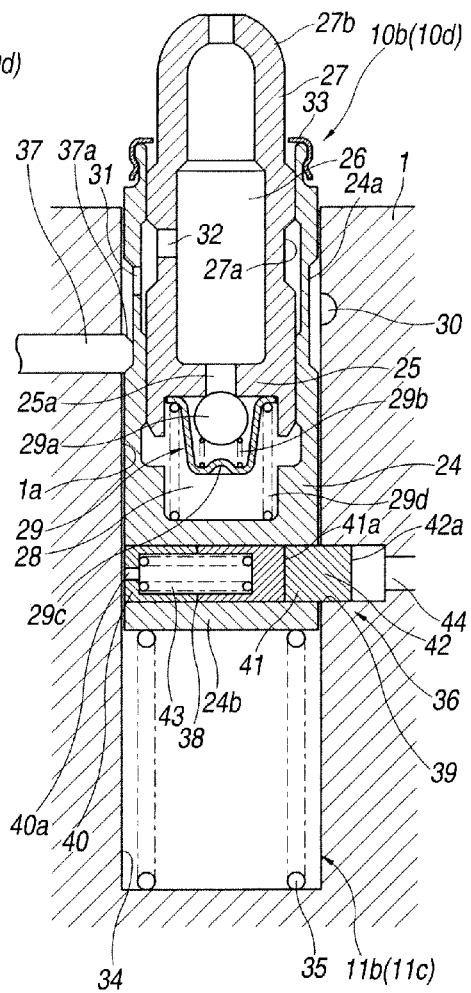

First valve stop mechanisms 11b, 11c, as shown in FIGS. 4A and 4B, include: a pair of column shaped sliding purpose holes continuously formed at a bottom side of respective retaining holes 1a; a pair of lost motion springs elastically disposed between a bottom surface of respective sliding purpose holes 34 and a lower surface of body 24 to bias second and fourth hydraulic pressure lash adjusters 10b, 10d toward an upward direction, respectively; and a pair of limitation mechanisms 36 limiting the lost motion of second and fourth hydraulic pressure lash adjusters 10b, 10d.

Each sliding purpose hole 34 has an inner diameter which is the same as the inner diameter of retaining hole 1a and each body 24 is slidably held toward a vertical direction in a continuation manner from retaining hole 1a.

Each lost motion spring 35 is formed by a coil spring to bias a bottom surface of body 24 toward an upward direction so as to slidably contact a tip head section 27b of plunger 27 on a recess section 6c at the lower surface of other end section 6b of swing arm 6.

A maximum upward movement position is limited by means of a stopper pin 37 inserted and arranged at the inside of cylinder head 1. That is to say, each stopper pin 37 is arranged in an axial right angle direction toward body 24 within cylinder head 1 and tip section 37a is exposed and slidably engaged within first recess groove 24a so that tip section 37a is contacted on the lower end edge of first recess groove 24a so that a maximum upper sliding position of body 24 is limited.

Hence, each hydraulic pressure lash adjuster 10b, 10d performs the lost motion by being vertically stroked between retaining hole 1a and sliding purpose hole 34 via a spring force of a lost motion spring 35 involved in the swing motion of swing arm 6 so that a function as the swing fulcrum of swing arm 6 is lost and a lift operation of swing cam 7 is absorbed and the open-or-closure operation of each intake valve 3a is stopped.

Figure 4C:
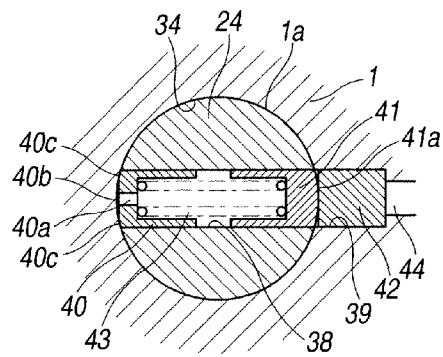

Each limitation mechanism 36 of first valve stop mechanisms 11b, 11c is, as shown in FIGS. 4A through 4C, mainly constituted by a moving purpose hole 38 penetrated in an inner diameter direction of bottom section 24b of body 24; a limitation purpose hole 39 formed within cylinder head 1 in the axial right angle direction to retaining hole 1a; a spring supporting purpose retainer 40 fixed to an inner part one end side of moving purpose hole 38; a sliding pin 41 slidably disposed in an inside of moving purpose hole 38 and slidably disposed within moving purpose hole 38; a column shaped limitation pin (first limitation pin) 42 movable across moving purpose hole 38 and limitation purpose hole 39; and a return spring 43 biasing limitation pin 42 toward the limitation purpose hole 39 via sliding pin 41.

When body 24 is limited at the maximum uppermost position by means of stopper pin 37, limitation purpose hole 39 is made coincident with moving purpose hole 38 from the axial direction. The inner diameter is formed with substantially the same as moving purpose hole 38 and the signal hydraulic pressure is introduced at one end side from oil passage hole 44 formed within cylinder head 1.

It should, herein, be noted that the limitation of the rotational direction of body 24 slightly increases a projection quantity of stopper pin 37 and an axially elongated direction slit is disposed within first recess groove 24a of body 24 and can easily be achieved by the engagement of the tip of stopper pin 37. Alternatively, another separately independent rotational limitation member may be disposed between cylinder head 1 and body 24.

Retainer 40 is formed in a lidded cylindrical shape and an inspiring hole 40a to secure a smooth movement of sliding pin 41 is penetrated through a bottom wall of retainer 40. A center section 40b to which inspiring hole 40a of a rear end surface is exposed is formed in a flat shape. Rear end sections 40c, 40c are formed in an arc surface shape having the substantially same radius of curvature as an inner peripheral surface of sliding hole 34 to secure a smooth slidability. In addition, an axial length of this retainer 40 is set to have a length limiting a more retraction movement by contacting a trailing edge of limitation pin 42 on a tip edge of moving purpose hole 38 before limitation pin 42 is completely housed within moving purpose pin 38, as shown in FIG. 4B. It should be noted that a slight quantity of working oil leaked in moving purpose hole 38 is introduced within moving purpose hole 34 passing through an inner peripheral surface of sliding purpose hole 34 and an inner peripheral surface of sliding purpose hole 34.

Sliding pin 41 is formed in a lidded cylindrical shape as shown in FIGS. 4A and 4C. An outer diameter of sliding pin 41 is formed to be slightly smaller than an inner diameter of moving purpose hole 38 to secure the smooth slidability. A tip surface 41a at a tip section is formed in an arc surface shape having the same radius of curvature as the inner peripheral surface of sliding purpose hole 34.

Limitation pin 42 is formed in a solid column shape. The axial length of limitation pin 42 is formed to be the substantially same as the axial length of limitation purpose hole 39. As shown in FIG. 4A, a spring force of return spring 43 causes limitation pin 42 to be moved within limitation purpose hole 39 via swing pin 41 according to a spring force of return spring 43 as shown in FIG. 4A. At this time, the whole of limitation pin 42 is housed within limitation purpose hole 39. Thus, the movement in the vertical direction of hydraulic pressure lash adjusters 10b, 10d at the R side of first and second cylinders #1, #2, namely, the lost motion is carried out.

In addition, an outer diameter of this limitation pin is formed to be slightly smaller than the inner diameter of each of moving purpose hole 38 and limitation purpose hole 39 to secure the smooth slidability with respect to these holes.

The hydraulic pressure supplied from oil passage hole 44 to limitation purpose hole 39 is received by tip surface 42a of limitation pin 42 as a flat pressure receiving surface 42a. Thus, limitation pin 42 is moved toward the leftward direction as viewed from FIG. 4B against the spring force of return spring 43. Then, sliding (purpose) pin 41 is contacted on retainer 40 from the axial direction. In this case, the tip section of limitation pin 42 is housed bridging moving purpose hole 38 from limitation purpose hole 38 against the spring force of return spring 43. Thus, a vertical movement of second and fourth hydraulic pressure lash adjusters 10b, 10d of first and second cylinders #1, #2 is limited, namely, the lost motion is limited so that these lash adjusters are locked to cylinder head 1.

The hydraulic pressure supplied from first oil pump 54 under pressure is supplied as a signal hydraulic pressure via a first electromagnetic switching valve 55 to oil passage hole 44 (limitation purpose hole 39), as shown in FIG. 7.

That is to say, first electromagnetic switching valve 55 provides a switching energy supply/supply stop conversion means (switching energy supply/supply stop conversion means) for converting between a state in which the hydraulic pressure which is a switching energy is supplied and a state in which the supply is stopped.

First electromagnetic switching valve 55 switches a spool valve slidably disposed at an inside of the valve body (not shown) in an ON or OFF manner by means of an electromagnetic force of the solenoid and a spring force of the coil spring. In the above-described solenoid, the control current from same control unit 53 to control the drive of electrically driven motor 51 is supplied or not supplied to its solenoid portion (in a on state or in an off state). Thus, first electromagnetic switching valve 55 is switching controlled between a state in which a pump discharge passage is communicated with a first oil passage hole 44 to supply the first signal hydraulic pressure to first limitation pin 42 and a state in which the pump discharge passage is closed to communicate between oil passage hole 44 and drain passage 45.

Hence, during the engine stop, no power supply to the solenoid from control unit 53 is carried out so that first electromagnetic switching valve 55 closes the pump discharge passage to communicate oil passage 44 with drain passage 45. Thus, the lost motion by means of first valve stop mechanisms 11b, 11c is enabled to be operation enabled state. That is to say, in a case where the supply of hydraulic pressure which is the switching energy is stopped, first valve stop mechanisms 11b, 11c are mechanically stable in the valve stop state, namely are of a valve stop stable type.

On the other hand, in second valve stop mechanism 11a, slide pin 41 is integrally formed with limitation pin 42, although the structure of second limitation mechanism 46 is different from first limitation mechanism 36 of first valve stop mechanisms 11b, 11c, as shown in FIGS. 5A, 5B, and 5C.

That is to say, the same reference numerals are designated to the structural members common to first limitation mechanism 36 and will briefly be explained. Second limitation mechanism 46 is mainly constituted by a moving purpose hole 38 penetrated in an inner radial direction of a bottom section 24b of body 24; a limitation purpose hole 39 formed in the axial right angle direction as retaining hole 1a within cylinder head 1; a retainer 40 fixed to one end side of the inner part of moving purpose hole 38; a second limitation pin 47 slidably disposed within the inside of moving purpose hole 38 and which is movable from moving purpose hole 38 across limitation purpose hole 39; and a return spring 42 elastically installed between a rear end of second limitation pin 47 and retainer 40 which biases second limitation pin 47 in the direction of limitation purpose hole 39 to bias second limitation pin in the direction of limitation purpose hole 39.

An axial length of retainer 40 is set to be the length which limits the further retraction movement by contacting the tip edge of retainer 40 on the rear end of second limitation pin 47 at a time point at which second limitation pin 47 is completely housed within moving purpose hole 38, as shown in FIG. 5B.

Second limitation pin 47 is formed cylindrically so that a solid tip end 47a is axially extended and the outer diameter of second limitation pin 47 is formed to be slightly smaller than the inner diameter of each of moving purpose hole 38 and limitation purpose hole 39 to secure the smooth slidability. In addition, second limitation pin 47 is retracted (retraction movement) against the spring force of return spring 42 as shown in FIG. 5B so that a tip section of second limitation pin 47 is dropped out from limitation purpose hole 39 so that the whole of return spring 42 is housed within moving purpose hole 38 to release the limitation.

In addition, this second limitation pin 47 is formed in an arc surface shape having the same radius of curvature as the inner peripheral surface of sliding purpose hole 34 in order to secure the favorable slidability.

Retainer 40 is formed in the flat shape at center section 40b to which inspiring hole 40a at the rear end surface is exposed. However, each of outer end sections 40c, 40c is formed in the arc surface shape having the same radius of curvature as the inner peripheral surface of sliding purpose hole 34.

The hydraulic pressure supplied under pressure from second oil pump 64 is supplied as a second signal hydraulic pressure via second electromagnetic switching valve 65, as shown in FIG. 7.

Second electromagnetic switching valve 65 (second hydraulic pressure supply/supply stop conversion means) switches a spool valve slidably disposed at an inside of the valve body (not shown) into two stages in ON and OFF manner according to the electromagnetic force of the solenoid and the spring force of the coil spring. The control current from control unit 53 is supplied or not supplied so as to be switching controlled between the state in which the solenoid is communicated between pump discharge passage and second oil passage hole 48 to supply the second signal hydraulic pressure to second limitation pin 47 and the state in which the pump discharge passage is closed to communicate between second oil passage hole 47 and second drain passage 66.

Hence, during the stop of the engine, the power is not supplied to the solenoid from control unit 53. Second electromagnetic switching valve 64, at this time, communicates between second oil passage 48 and second drain passage 45 with the pump discharge passage closed. Thus, the lost motion by means of second valve stop mechanism 11a is not operated so that first hydraulic pressure lash adjuster 10a is in the valve operation state in which this lash adjuster 10a is locked to cylinder head 1. That is to say, second valve stop mechanism 11a is of a valve operation type valve stop mechanism which mechanically stables in the valve operation state, in a case where the supply of the hydraulic pressure which is the switching energy is stopped.

Control unit 53 detects an engine driving state on a basis of an information signal such as an engine (rotation) speed, a load, a throttle valve opening quantity from various kinds of sensors such as a crank angle sensor, an airflow meter, a water coolant temperature sensor, a throttle valve opening angle sensor, and so forth and drivingly controls electrically driven motor 51 in response to the engine driving state and the information signal (VEL control shaft actual position signal) from the rotation position sensor (not shown) detecting the present rotational position of control shaft 21 to control the rotational position of control shaft 21. This causes the lift quantity and the working angle of four intake valves 3a, 3b of first and second cylinders #1, #2 to be varied.

Figure 8:
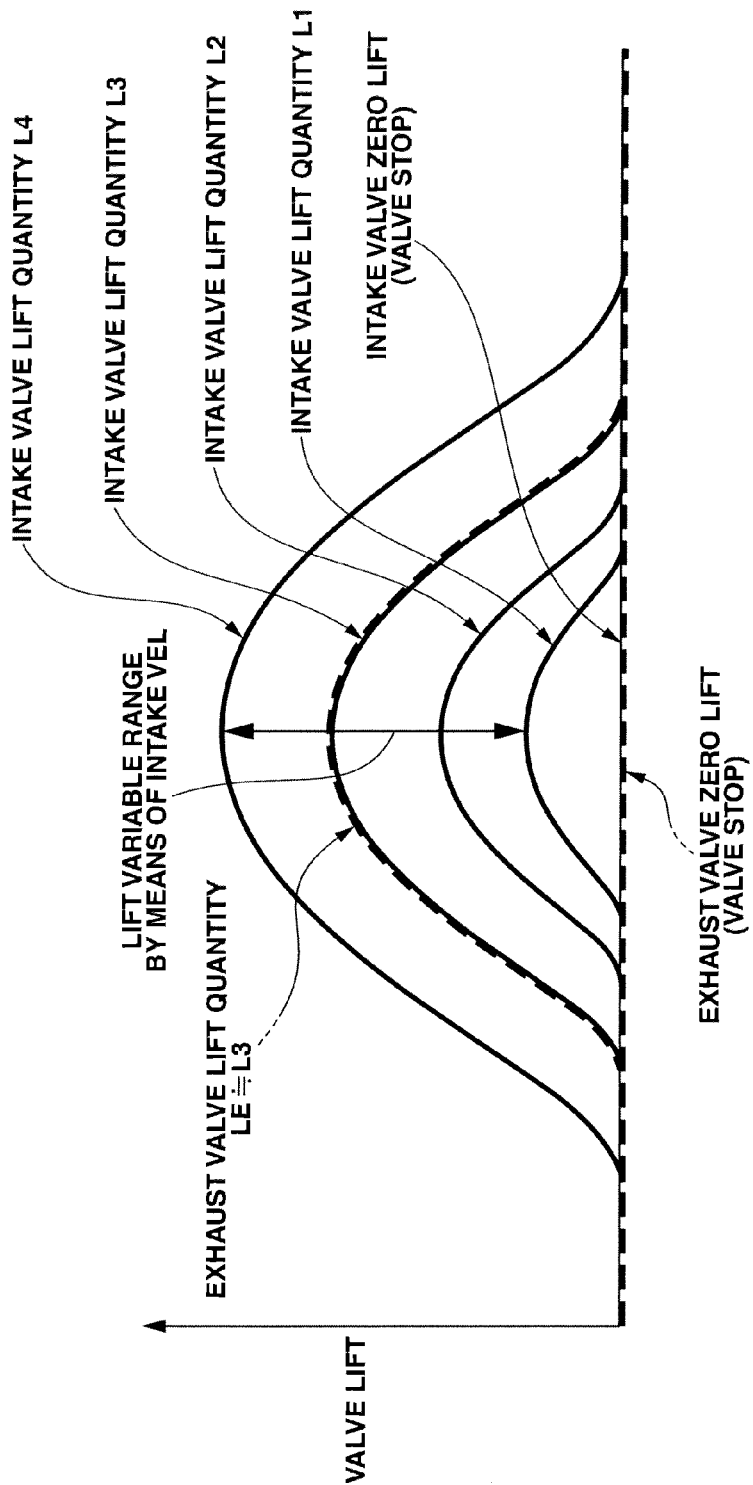
FIG. 8 is a valve lift (quantity) characteristic graph of each of intake valves and exhaust valve in the first embodiment.

That is to say, as shown in FIG. 8, the lift quantities of respective intake valves 3a, 3b are varied in a range from a minimum L1 to a maximum L4 in a case where corresponding respective hydraulic pressure lash adjusters 10a, 10b, 10d are locked to cylinder head 1 without lost motion by means of second and first valve stop mechanisms 11a, 11b, 11c not to perform the valve stop.

The operation of VEL in a case where respective intake valves 3a, 3b are controlled to maximum lift quantity L4 is shown in FIGS. 9A, 9B, 10A, and 10B.

FIGS. 9A and 9B show the R side of, for example, first cylinder #1 in which the valve stop mechanisms are equipped. The R side of second cylinder #2 and F side of first cylinder #1 are the same and, in these cylinder sides, First and second valve stop mechanisms 11b, 11c, 11a are equipped. The states indicated in FIGS. 9A and 9B indicate, for example, the valve operation state in which second hydraulic pressure lash adjuster 10b is locked to cylinder head 1 without the lost motion by means of first valve stop mechanism 11b. The rotational angle of control shaft 21 is θ4 (refer to FIGS. 9A and 10A) corresponding to maximum lift quantity L4. Drive cam 5a is rotated in the clockwise direction and provides a maximum lift L4 at a position indicating a peak lift in FIG. 9A and the valve is closed at the position denoted by FIG. 9B. The similar action is resulted in the case of R side of second cylinder #2 having first valve stop mechanism 11c by only replacing the F side of first cylinder #1 with second valve stop mechanism 11a. It should be noted that the valve operation is resulted (valve open-or-closure action) in the same lift characteristic.

Figure 10A:
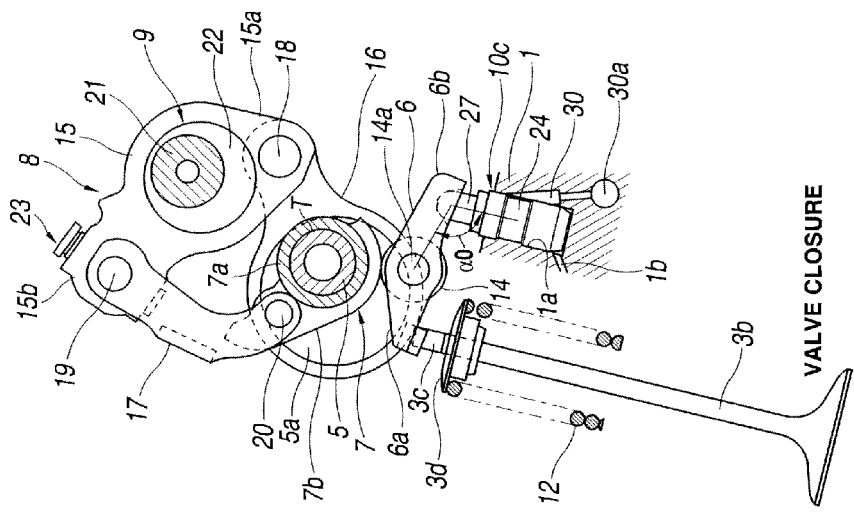
FIG. 10A is an explanatory view of the action of the intake valve which is open when the intake valve in which the valve stop mechanism in this embodiment is not equipped is controlled to be a maximum lift quantity (L4) and FIG. 10B is an explanatory view of the action when the same intake valve is closed.
Figure 10B:
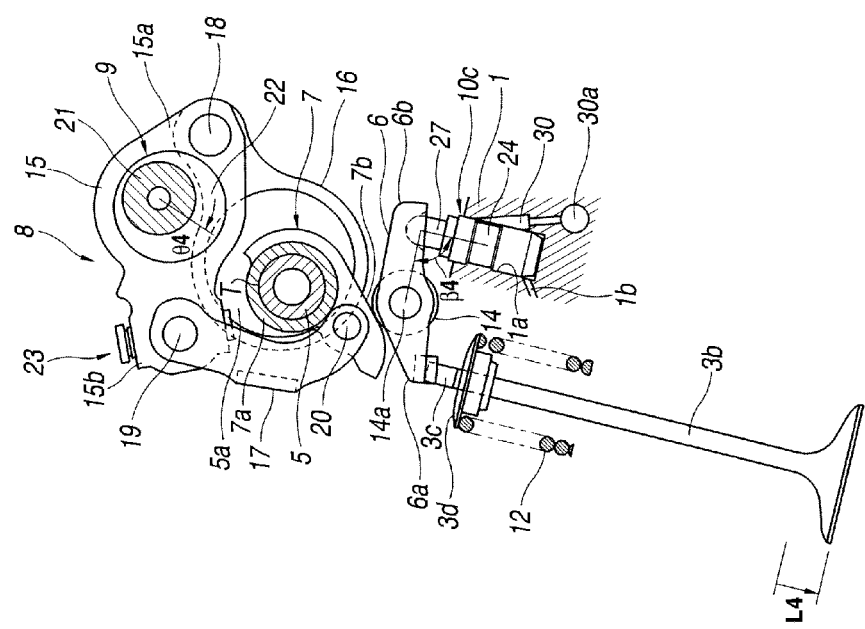

On the other hand, FIGS. 10A and 10B show intake valve 3b at the F side of second cylinder #2 which is working at all times and in which no valve stop mechanism is disposed and third hydraulic pressure lash adjuster 10c. The valve stop mechanism is not equipped therein. Hence, the valve is operated with the same lift characteristic at the R side of second cylinder #2 in the case of the valve operation state in FIGS. 9A and 9B.

FIGS. 11A and 11B are action explanatory view in a case where the intake valves are controlled to be a minimum lift and show the operation of VEL in a case where intake valve 3a is controlled to the minimum lift quantity L1. On the other hand, in a case where first valve stop mechanism 11b is in the valve operation state (lost motion operation), as shown in FIG. 11C, second hydraulic pressure adjuster 11b is in the lost motion by M1 so that the lift quantity is continued to be in the zero state.

The operation of R side of other second cylinder #2 equipped in the first valve stop mechanism is the to same as R side of first cylinder #1 shown in FIGS. 11A, 11B, and 11C. In addition, F side of first cylinder #1 having the second valve stop mechanism is the valve operation stable type shown in FIGS. 11A, 11B, and 11C. The operation shown in FIG. 11 is the same. Furthermore, is as far as the F side of second cylinder #2 in which no valve stop mechanism is equipped is concerned, it indicates the same lift characteristic as R side of first cylinder #1 in the case of the valve operation state shown in FIGS. 11A and 11B.

In addition, the control signal is outputted from control unit 53 to an intake VTC electromagnetic switching valve (not shown) of intake VTC in accordance with the engine driving state. Thus, the hydraulic pressure discharged from oil pump 54 or discharged from oil pump 64 is relatively rotated in the advance angle side or in the retardation angle side so that the rotational phase of drive shaft 5 is made variable with respect to the crankshaft via the hydraulic pressure discharged from oil pump 54 or oil pump 64. Consequently, the phases of valve open-or-closure timing of respective intake valves 3a, 3a, 3b, 3b and peak lifts are controlled.

[Variably Operated Valve System at Exhaust Side]

The variably operated valve system at the exhaust side is shown in FIGS. 2, 3, and 7. No lift variable mechanism (VEL) such as the intake side is provided. However, the same phase variable mechanism (exhaust VTC) as intake VTC described above and the valve operation stable type valve stop mechanism of only first cylinder #1 is provided.

That is to say, as shown in FIG. 2, two exhaust valves 71a, 71a, 71b, 71b per cylinder formed within cylinder head 1 are installed which open or close a pair of exhaust ports 70, 70. In other words, first and second exhaust valves 71a, 71a are disposed at the F and R sides of first cylinder #1 and first and second exhaust valves 71b, 71b at the F side and R side of second cylinder #2.

As exhaust (valve) side variably operated valve system, an exhaust cam shaft 73 having an egg shaped rotational cam 73a which performs a valve open operation for respective exhaust valves 71a, 71a, 71b, 71b against the spring force of respective valve springs 72. The exhaust cam shaft 73 is arranged along the forward-or-backward direction of the engine at the upper side of each cylinder. Respective exhaust valves 71a, 71a, 71b, 71b are open or closed with a constant valve lift quantity LE shown in FIGS. 8 and 12A as a peak lift via roller 77 and each swing arm 74 intervened between respective exhaust valves 71a, 71a, 71b, 71b and respective swing arms 74.

Four hydraulic pressure adjusters 75a, 75b, 75c, 75d are respectively which are supporting members (pivots) which make zero lash adjustments for the gap between each swing arm 74 and each exhaust valve 71a, 71a, 71b, 71b and the gap between base circles of respective rotational cams 73a, respectively. That is to say, four hydraulic pressure lash adjusters 75a, 75b, 75c, 75d are disposed at the exhaust side. First and second hydraulic pressure lash adjusters 75a, 75b are disposed in first cylinder #1 and third and fourth hydraulic pressure adjuster 75c, 75d are disposed in second cylinder #2.

It should, herein, be noted that first hydraulic pressure lash adjuster 75a is disposed at the F side of first cylinder #1 and second hydraulic pressure lash adjuster 75b is disposed at the F side of second cylinder #1, second hydraulic pressure lash adjuster 75b is disposed at the F side of second cylinder #2, third hydraulic pressure lash adjuster 75c is disposed at the F side of second cylinder #2, fourth hydraulic pressure lash adjuster 75d is disposed at the R side of second cylinder #2

Each of first and second lash adjusters 75a, 75b at exhaust valve sides 71a, 71a of F and R sides of first cylinder #1 shown in FIG. 2 is provided with the corresponding lost motion mechanism (third valve stop mechanisms 11d, 11e). These third valve stop mechanisms 11d, 11e have the same structures as second valve stop mechanism 11a at the F side of first cylinder #1 at the intake valve side shown in FIGS. 5A, 5B, and 5C. That is to say, in a case where the supply of the hydraulic pressure which is the switching energy is stopped, each of the third valve stop mechanisms is of the valve operation stable type in which the mechanism is mechanically stable in the valve operation state. Whereas the second valve stop mechanism is at the intake valve side, these third valve stop mechanisms are used at the exhaust valve side. Hence, in order to avoid the confusion, these mechanisms are called the third valve stop mechanisms.

On the other hand, third and fourth hydraulic pressure lash adjusters 75c, 75d of exhaust valves 71b, 71b at the F side and R side of second cylinder #2 are not equipped with the valve stop mechanisms.

Since each of third valve stop mechanisms 11d, 11e has the same structure as second valve stop mechanisms 11a shown in FIGS. 5A, 5B, and 5C as described above, the same reference numerals as those shown in FIGS. 5A, 5B, and 5C are attached and the specific explanations will be omitted.

That is to say, each of third valve stop mechanisms 11d, 11e includes: corresponding one of column shaped sliding purpose holes 34 continuously formed at the bottom side of each retaining hole 1a of cylinder head 1; a corresponding one of lost motion springs 35, 35 which biases the corresponding one of first and second hydraulic pressure lash adjuster 75a, 75b; and a third limitation mechanism 76 which limits the lost motion of the corresponding one of first and second hydraulic pressure lash adjuster 75a, 75b.

The valve lift quantities of first and second exhaust valves 71a, 71a at first cylinder side #1 in which third valve stop mechanisms 11d, 11e are equipped are zero lift, as shown by a broken line in FIG. 8, in a case where the valve is stopped due to the lost motion, and have peak lift quantities of LE constant in a case where no valve stop is carried out.

This is the substantially same as a middle lift quantity L3 slightly larger than respective intake valves 3a, 3a, 3b, 3b of first and second cylinders #1, #2 denoted by the solid line in FIG. 8 but is set to be smaller than a maximum lift quantity L4.

FIGS. 12A, 12B, and 12C show the operation state at the exhaust valve side of first cylinder #1. FIG. 12A shows a state in which first and second exhaust valves 71a, 71a is operated with a slightly large constant peak lift quantity LE ($\approx$L3). FIG. 12B shows a state in which each of first and second exhaust valves 71a, 71a is closed. FIG. 12C shows a state of a lost motion operation state (the valve stop state) of the corresponding one of the first and second lash adjusters 75a, 75b by means of the corresponding one of third valve stop mechanisms 11d, 11e.

A lost motion quantity of each of hydraulic pressure lash adjusters 75a, 75b by means of each of exhaust valves 71a, 71a at first cylinder #1 is relatively large as M3, as shown in FIG. 12C. In addition, an angle $\alpha$3 formed by swing arm 74 and the lost motion direction is relatively large value. It should, herein, be noted that this angle $\alpha$3 is, more specifically, an angle formed by a line connecting the swing fulcrum of swing arm 74 to a rotational center of the roller and an axial line as a lost motion direction of the hydraulic pressure lash adjuster.

However, when about $\alpha$3 shown in FIG. 12C is obtained, a head section of each of hydraulic pressure lash adjusters 75a, 75b is tightly contacted on a recess section of each swing arm 74 without floating even when the engine is rotated at a high rotation. Thus, a smooth lost motion operation can be obtained. Conversely, a value of each of M3 ($\alpha$3) is within a range in which the smooth lost motion operation is obtained. Suppose that, if the value of M3 ($\alpha$3) further becomes increased to M4 ($\alpha$4), the contact section becomes uniform and provides a local contact. Therefore, a deviation between both head section and recess section described above occurs and, furthermore, a float (separation) between these contact section is generated. Therefore, a smooth lost motion operation is not obtained and an unmatched behavior is often generated. With these behaviors taken into consideration, on the intake valve side in which lost motion quantity M is varied according to the VEL control, in a high rotation area, lost motion quantity M by means of the VEL control is limited to the value of M 3.5 ($\alpha$3.5) as will be described later.

On the other hand, third and fourth lash adjusters 75c, 75d at the exhaust side of second cylinder #2 having no valve stop mechanism has the same structure as third lash adjuster 10c at the intake side of second cylinder #2 shown in FIG. 6.

Then, the cam profile of rotational cam 73a is set to be the same so that a stationary valve lift quantity of each exhaust valve 71b, 71b of second cylinder #2 has the peak lift quantity to be LE in the same way as each of exhaust valves 71a, 71a of first cylinder #1.

It should be noted that, as shown in FIG. 12A, an angle $\beta$3 formed between swing arm 74 in a peak lift state and the lost motion direction is near to ideal angle of 90°. Even if a valve jumping in the high rotation area is generated, a lateral deviation between swing arm 74 and head section 27 of the hydraulic pressure adjuster is not easily generated and a drop out of swing arm 74 is not easily generated.

In addition, on the intake side, the angle formed by swing arm 6 in the peak lift state to the lost motion direction indicates the angle near to the ideal angle of 90° as denoted by $\beta$4 in the lift quantity control L4 shown in FIGS. 9A and 10A.

Then, similarly, an irregular behavior such as the drop out of the swing arm at the time of the valve operation is not easily generated. That is to say, the difference between $\beta$3~$\beta$4 and 90° at the time of valve operation is smaller than the difference between $\alpha$3 and 90° at the time of the lost motion so that the irregular behavior such as the drop out of the swing arm becomes more difficult to occur than at the time of the lost motion.

It should be noted that exhaust VTC described above has the same structure as intake VTC described above. Control unit 53 outputs the control signal to the exhaust VTC electromagnetic switching valve (not shown) of the exhaust VTC in accordance with the engine driving state so that the vane rotor (not shown) is relatively rotated toward the advance angle side or toward the retardation angle side with respect to the crankshaft via the hydraulic pressure discharged from oil pump 54 or oil pump 64 to vary the rotational phase of drive shaft 5. Thus, the open-or-closure timing (lift phase) of each exhaust valve can be controlled. It should be noted that the oil pump to supply the hydraulic pressure to exhaust VTC electromagnetic switching valve may be common to the oil pump supplying the hydraulic pressure to intake VTC electromagnetic switching valve or may be installed independently. In the former case, the engine system structure can be simplified. In the latter case, the conversion response characteristic of each VTC is improved.

[Operation of Variably Operated Valve System]

Hereinafter, an operation of the variably operated valve system in the first embodiment will be described.

When the engine is stopped, the hydraulic pressure of each oil pump 54, 64 is not operated. Hence, the signal hydraulic pressure is in a non-operation state or in a low pressure state irrespective of the on or off position of first and second electromagnetic switching valves 55, 65. First valve stop mechanisms 11b, 11c are in the state of the valve stop mode due to the valve stop stable type, namely, in the state in which the lost motion operation can be achieved. On the other hand, second valve stop mechanism 11a and third valve stop mechanisms 11d, 11e are in the valve operation state (mode) due to the valve operation stable type.

Figure 14:
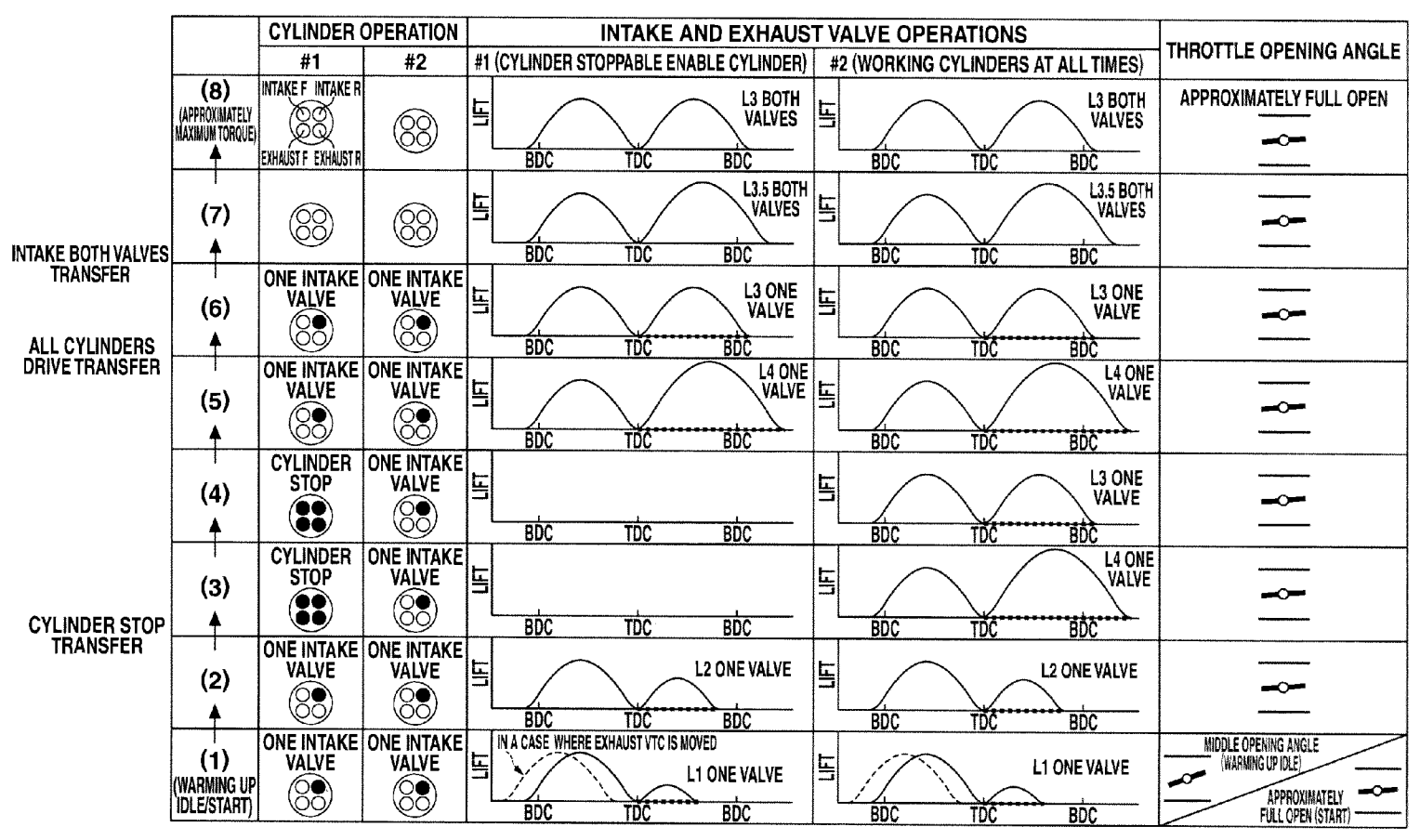

Hence, as shown in (1) of FIG. 14, two intake valves 3a, 3b at the one side (R side) of both of first and second cylinders #1 and #2 are in the valve stopped state and the remaining two intake valves 3a, 3b and all exhaust valves are in the drive (valve operation state) state.

Even if a start combustion is started with a cranking to start the engine, the hydraulic pressure of oil is pumps 54, 64 is not sharply raised and the above-described state (form) can be maintained.

In addition, the signal of first electromagnetic switching valve 55 (first valve stop mechanism is converted) and the signal of second electromagnetic switching valve 65 (the second and third valve stop mechanisms are converted) are in the off controlled state, namely, each signal hydraulic pressure is in the state in which only low pressure is acted upon. Therefore, even if the hydraulic pressure of each of oil pumps 54, 64 is raised at the earlier timing, the above-described state can be maintained.

During the engine start, a friction of each part of the engine is increased due to the low engine temperature. Then, a demanded intake air quantity is large and a large throttle opening angle as denoted by a throttle opening angle of FIG. 14 (1) is demanded, and an explosion interval in all cylinders (whole cylinder) driving is demanded to be shortened. In addition, at the time of the engine start, a low engine temperature is resulted and a combustion failure becomes easy to occur.

Whereas, in this embodiment, the combustion can be improved according to an agitation by an intake swirl due to the stop of intake valves 3a, 3b (one intake valve stop) at the one side (R side). In addition, the increase of the friction of each part of the engine described before can be reduced due to a reduction of a valve operated friction to a substantially half. Consequently, a start friction can be reduced and the combustion can be improved so that a startability can be improved.

Furthermore, in this embodiment, due to the electrically driven intake VEL can achieve an earlier closure before a bottom dead center in the intake valve with a small lift quantity (for example, a minimum lift L1) at the drive intake valve sides 3a, 3b at the F side of first and second cylinders #1 and #2. Thus, a further engine friction can be reduced and a compression and a pump loss can be reduced. Then, an engine drive (starting) load can be reduced so that a remarkable startability can be improved. It should be noted that, if the closure timing of the intake valves is in the earlier closure mode before the bottom dead center, an effective compression ratio is reduced and, in general, the combustion tends to be worsened. However, the worsening of the combustion is recovered due to the combustion improvement effect due to the intake swirl or the closure timing is more earlier so that a more remarkable reduction of the compression and pump loss can be reduced. Consequently, a start performance of the engine can more remarkably be increased.

Next, at a time of idling drive after a completion of a warming up of the engine, the friction of each part of the engine is reduced. In order to improve the fuel efficiency, an engine rotational number is suppressed to, for example, 600 rpm than a start combustion state (for example, 1000 rpm). Hence, as shown in the upper side of a throttle valve opening angle shown in FIG. 14 (1), the throttle valve opening angle is throttled to a middle opening angle. Even in the warming up idling state, according to a quality demand of the engine idling, all of the cylinder drives are carried out to suppress an idling rotation variation. A further favorable combustion and a low friction are demanded.

Hence, respective signals to first and second electromagnetic switching valves 55 and 65 are continued to be in the off state. That is to say, since the intake valve and exhaust valve states which are the same as those at the time of the engine start are continued, the fuel efficiency improvement of combustion due to the intake swirling according to the one side intake valve stop and a low engine friction due to the one side intake valve stop not only improve the fuel efficiency but also can contribute on the reduction in the variation of the idling rotation.

Furthermore, since, in this embodiment, electrically driven type intake VEL can provide the earlier closure before the bottom dead center of the intake valve due to a small lift (for example, L1) even at the drive intake valve side, the further reduction of the friction of each part of the engine can be achieved and the compression and the pump loss can be reduced. Furthermore, the fuel efficiency can be improved so that the rotation variation can be reduced.

It should be noted that, when the closure timings of the intake valves are in the earlier closed state before the bottom dead center, the effective compression ratio is reduced and, in general, there is a possibility of the worsening of the fuel efficiency. However, due to the intake swirl effect described above, the fuel efficiency can be recovered and the closure timing can further be in the earlier closure timing and the variation on the rotation can, furthermore, be reduced.

Next, various effects of the first embodiment will be described with one example of acceleration process of ((1) ⇒ (2) ⇒ (3) ⇒ (4) ⇒ (5) ⇒ (6) ⇒ (7) ⇒ (8)) from the driving condition (1) in the warming up idling state to the driving condition (8) in the vicinity to a maximum torque on a basis of FIGS. 13 and 14.

Figure 13:
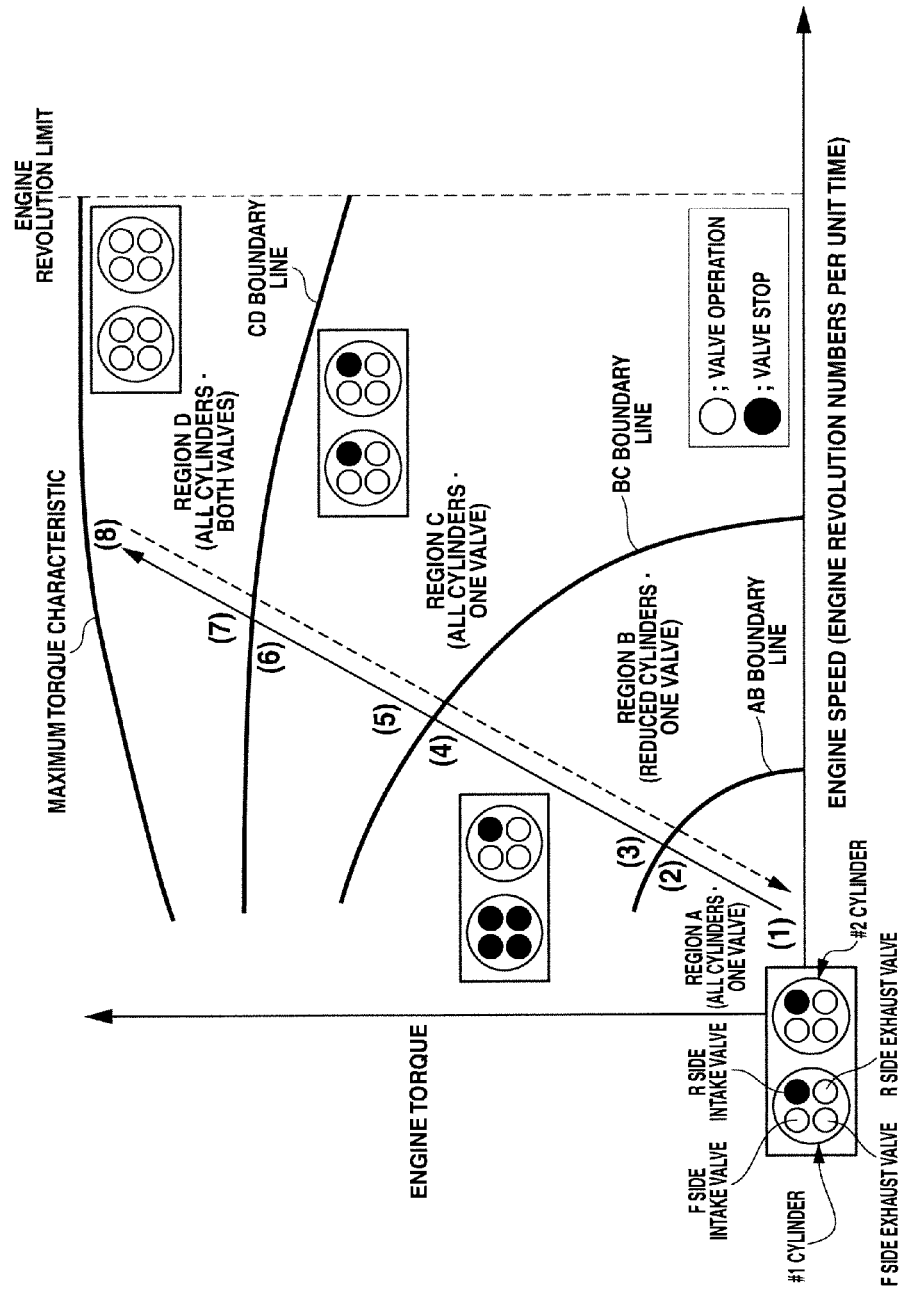
FIG. 13 is a graph representing a valve stop drive region and an all cylinders drive region on a map of an engine speed and an engine torque in the first embodiment.

It should be noted that FIG. 13 shows a working cylinder number and operating valve number map (a lateral axis denotes an engine (rotational) speed and a longitudinal axis denotes an engine torque). In a region A which provides lowest engine speed and engine torque, all cylinders (#1, #2) are operated (worked) and intake valves 3a, 3a, 3b, 3b of all cylinders are in one-valve operation (intake valves at the F side are driven but the intake valves at the R side are valve stopped). A region B which provides a slightly higher rotation or slightly higher engine torque than region A is a region of reduced cylinder•one valve (reduced cylinder driving•one intake valve operation). That is to say, region B is one intake valve operation state. In details, for first cylinder #1, all of intake valves 3a, 3a, 71a, 71a are valve stopped so as to be a cylinder halt mode. For second cylinder #2, one intake valve operation mode is entered in which R side intake valve 3b is continuously valve stopped but intake valve 3b of F side and both exhaust valves 71b, 71b are continuously valve driven (valve operation). It should be noted that the term of reduced cylinder means that part of cylinders is in a cylinder pause mode and the remaining cylinder(s) is in the cylinder working mode.

A region C in which the rotation number or the engine torque is slightly higher than region B shown in FIG. 13 is a region of all cylinders•one valve. That is to say, both cylinders indicate one valve operation mode. That is to say, both of first and second cylinders are such that the valves are stopped only through R side intake valves, F side intake valves are valve operated, and all of the exhaust valves are driven.

A region D in which the engine speed or the engine torque is slightly higher than region C is a region of all cylinders•both valves (all cylinders driving•both intake valves operation). That is to say, in region D, both of first and second cylinders #1 and #2 are operated but all of intake and exhaust valves at both cylinders are driven.

It should be noted that regions from region A to region B are the region in which one intake valve is operated (the remaining intake valve is stopped). A combustion improvement effect by means of the intake swirl is obtained from both of all cylinders region (all cylinders operations (workings)) (namely, regions A and C) and reduced cylinder region (region B). Thus, the fuel efficiency in terms of the whole vehicle (as a total of the vehicle) can be improved.

Specifically, when the engine torque or the engine speed is increased with the accelerator pedal depressed from the warming up idling drive (1) (FIGS. 13 and 14) in region A, the opening angle of the throttle valve at (2) (FIG. 13) is substantially full open state and the lift quantity of the intake valve is, for example, increased to L2. A working angle expansion of the intake valves and the intake VTC causes the lift phase to a slightly retardation angle so that the intake valve closure timing is converted to the retardation angle side to approach to the bottom dead center and the intake air quantity is increased to correspond to the increase in the engine torque. That is to say, while the pump loss is sufficiently suppressed with the throttle valve in to substantially full open state, the torque can be increased and the fuel efficiency can be improved.

it should be noted that, by controlling the open timings of the intake valves to slightly retardation angle side, the variations of the valve overlap with the exhaust valves are suppressed. Thus, a transient variation of an EGR (Exhaust Gas Recirculation) gas quantity within the cylinders is suppressed to suppress the variation of the valve overlaps with the exhaust valves. Consequently, the rotation variation of the engine can be suppressed by suppressing an unstability of the transient combustion.

It should be noted that, during an interval from the warming up idling driving (1) to the low rotation and low load (2), a driving region that a vehicle driver gives an unmatched feeling and a vehicle body vibration to the rotation variation is provided. In addition, a demand to suppress the rotation variation is strong. Hence, all cylinders driving in which the rotation variations are basically small is demanded. As a prerequisite, as described above, the fuel efficiency is improved and the rotation variation due to the improvement in the combustion due to the intake swirl (which is due to the one valve stop) is suppressed.

When the engine torque or the engine speed is increased from the low engine speed and/or low engine torque region (2) and the driving state of the engine exceeds a boundary line between region A and region B (AB boundary line), the driving state is converted to the state in which one valve stop of the intake valves is maintained but converted to the reduced cylinder state. That is to say, the control signal of ON is supplied from control unit 53 to second electromagnetic switching valve 65 so that first cylinder #1 is transferred to the cylinder halt (stopped or paused) state (all of four intake and exhaust valves 3a, 3a, 71a, 71a of first cylinder #1 are stopped states).

Since, from among four intake and exhaust valves, one intake valve 3a at the R side of first cylinder #1 is naturally stopped state, only three valves (three locations) are transferred newly to the valve stopped states. Specifically, single intake valve 3a at F side of first cylinder #1 (second valve stop mechanism 11a) and two exhaust valves 71a, 71a (three valve stop mechanisms 11d, 11e) of first cylinder #1 (totally three).

Each of these respective second•third valve stop mechanisms 11a, 11d, 11e are classified into the valve operation stable type valve stop mechanism as shown in FIG. 5. When the second signal hydraulic pressure from second electromagnetic switching valve 65 becomes a high pressure, three limitation pins 47 located at a downstream with respect to second electromagnetic switching valve 65 are pushed out due to the high hydraulic pressure so that respective hydraulic pressure lash adjusters 10a, 75a, 75b are transferred to the lost motion state. Thus, all of three locations of second and third valve stop mechanisms 11a, 11d, and 11e are transferred into the valve stop states.

A volume oil is pushed out when three limitation pins 47 are moved is expressed as 3×A (pin area)×S (movement stroke). Suppose that the hydraulic pressure is P, a work done by oil is expressed as P×3×A×S. It should be noted that a time it takes to complete the work of 3PAS indicates a response delay.

Suppose that an ordinary cylinder halt (pause) to transfer in the case of the previously proposed variably operated valve system for the multi-cylinder engine described in the BACKGROUND OF THE INVENTION. Since all of four valves (four locations) are at one time transferred to the valve stops, a required work is increased to 4PAS and, thus, a conversion response characteristic to the cylinder halts becomes worsened. In addition, the oil passages to the limitation pins upon which the high pressure is acted are three in this embodiment but four. Correspondingly, oil leakages from the oil passages are increased and, thus, the acted hydraulic pressure P itself is reduced. In this respect, the conversion response characteristic becomes more remarkably worsened.

However, in this embodiment, the number of limitation pins 47 operated under the second signal hydraulic pressure (high hydraulic pressure) from second electromagnetic switching valve 65 are small as compared with the previously proposed variable operated valve system described above.

That is to say, the number of limitation pins at the intake side are two (locations) in the previously proposed variable operated valve system but, in this embodiment, is reduced to one (location). As viewed from the whole of the intake side and the exhaust side, the number of limitation pins are decreased from four locations to three locations. Consequently, the oil work (hydraulic pressure work) required to perform the conversion can be reduced and the reduction of the hydraulic pressure due to the oil leakage is minor. Thus, a transfer response characteristic to the cylinder halt (stop or pause) can be increased. In addition, consequently, it is not necessary to increase a capacity of oil pump 64 to which the hydraulic pressure is supplied to second electromagnetic switching valve 65. Or alternatively, this oil pump 64 is removed and oil pump 54 which supplies the hydraulic pressure to first electromagnetic switching valve 55 may be replaced to serve as oil pump 64.

It should be noted that only a single second electromagnetic switching valve 65 can branch the oil hydraulic pressure passage at the downstream side into three routes so that all of totally three mechanisms of limitation mechanism 46 of intake side second valve stop mechanism 11a, each limitation mechanism 76, 76 of exhaust side three valve stop mechanisms 11a, 11e can be operated. Hence, it is advantageous in terms of mountability and cost. In addition, only a single second electromagnetic switching valve (second hydraulic pressure supply/supply stop conversion means) 65 can, at one time, simultaneously convert all of three valve stop mechanisms of intake valve 3a at the F side of first cylinder #1 and respective exhaust valves 71a, 71a into the valve stop mode. Hence, a deviation of the conversion timing between the intake valves and the exhaust valves can be suppressed and a transient performance becomes stable.

As described above, even if the engine driving state is transferred to the reduced cylinder driving state, second cylinder #2 which is the working (operating) cylinder is maintained in one valve operation state of the intake valves, the intake swirl effect is maintained, and the friction of each part of the engine is more remarkably reduced with the three additive valve stop transfer in first cylinder #1 (further variably operated valve friction reduction). A cycle efficiency is improved due to a high load shift of the combustion in the working #2 cylinder due to the reduced cylinder driving so that the fuel efficiency can furthermore be improved. In other words, an in-cylinder surface on which a combustion gas is contacted is reduced by substantially half due to the reduced cylinder driving so that a cooling loss or so forth is reduced.

As described above, the fuel efficiency is, furthermore, improved. Especially, in this embodiment, at (3) (FIGS. 13 and 14), the intake VEL is used to control a large lift•large working angle (for example, lift quantity of L4) and intake VTC is used to control the intake VTC to a slightly retardation angle side. Thus, the fuel efficiency can furthermore be improved.

That is to say, when the engine driving state is transferred to the reduced cylinder driving, it is necessary to increase the load (torque) of working #2 cylinder by substantially twice. On the other hand, there is a countermeasure such that the intake valve closure timing approaches to the bottom dead center from the earlier closure side. In this case, the lift quantity is not sufficiently increased. If the load is tried to be increased, the intake valve closure timing approaches the bottom dead center and almost no pump load reduction effect is achieved.

Therefore, as described above, intake VEL is used to control the large lift•large working angle and intake VTC is used to control the closure timing to the slightly retardation angle side. Thus, the large lift causes the intake air quantity to be increased, the large working angle and the open-or-closure timing retardation angle control by means of the intake VTC sufficiently retards the intake valve closure timing fro the bottom dead center. Thus, the pump loss is suppressed and the effect of the fuel efficiency exceeding sufficiently the ordinary cylinder halt described above can be obtained.

It should be noted that, since the intake valve is closure timing can sufficiently be retarded from the bottom dead center, the compression is reduced. Thus, the rotation variation can be reduced and the increase in the rotation variation due to the reduced cylinder driving and the increase in the vehicle vibration due to the rotation variation described above can be suppressed with the addition of the rotation variation reduction effect according to the combustion stabilization due to the intake swirl which is the one intake valve stop effect. Consequently, the reduced cylinder driving region can be widened to the low torque side or the low rotation (engine speed) side.

In addition, since the intake valve closure timing is controlled to the retardation angle side from the bottom dead center, the generated engine torque itself can be reduced. As viewed from this, the reduced cylinder driving which is favorable in the fuel efficiency can be widened to the low load•low rotation side. In other words, the AB boundary line shown in FIG. 13 is widened to the low load•low engine speed (rotation) side while the rotation variation and the vehicle vibration are suppressed. Then, the fuel efficiency in terms of the total of the whole vehicle can furthermore be improved.

Furthermore, when the accelerator pedal is depressed to accelerate the vehicle, the intake valve closure timing is made near to the bottom dead center while the substantially full open state of the throttle valve is maintained to increase the load (engine torque) of the working cylinder at (4) (for example, lift quantity of L3). Thus, the volumetric efficiency is increased and the cylinder halt (pause) region which is favorable in the fuel efficiency is secured to the high rotation•high torque side. In other words, BC boundary line shown in FIG. 13 is secured to the high rotation•high torque side so that the fuel efficiency as the vehicle is improved.

Then, when the engine speed and the engine torque are further increased, the engine torque required in the reduced cylinder driving is not outputted and the driving state is converted into the all cylinders driving at (5). That is to say, the control signal is again turned to OFF. As shown in FIG. 5A, limitation pins 47 (totally three) of second and third valve stop mechanisms 11a, 11d, 11e (three locations) are moved toward a rightward direction as viewed from FIG. 5A according to the spring force of the corresponding return spring 42. Thus, hydraulic pressure lash adjusters 10a, 75a, 75b are simultaneously switched at the three locations from the state in which the lost motion operation can be moved to the state in which cylinder head 1 is locked and fixed. It should be noted that the movement of the limitation pins is not rested on the hydraulic pressure but is carried out according to the mechanical spring force of return spring 42. Even if the three location simultaneous conversions are carried out, the worsening of the response characteristic is not especially generated and the conversion operation becomes stable.

Thus, as shown in the cylinder operation of (5) in FIG. 14, first cylinder #1 starts the working (operation). On the other hand, the one intake valve state at both cylinders can be maintained. The combustion improvement effect (fuel efficiency improvement effect) due to the intake swirl, in a range from (1) through (5) in FIG. 14, is obtained not dependent upon all cylinders driving and the reduced cylinder driving.

Since the reduced cylinder driving is switched to all cylinders driving at (5), the engine torque is abruptly increased if the intake valve closure timing is left to be placed in the vicinity to the bottom dead center with lift quantity of L3. Therefore, the intake VEL changes the lift quantity to such a large lift (a large working angle) as L4 and the intake VTC is used to control the valve closure timing to the retardation angle so that the intake valve closure timing is controlled to the sufficient retardation angle side. Thus, an intake charging efficiency is suppressed and the pump loss is suppressed. Then, while the torque abrupt increase under the all cylinders driving is suppressed, the fuel efficiency in the all cylinders driving can be improved.

When the accelerator pedal is depressed to accelerate the vehicle, the lift (working angle) is reduced to L3, the intake VTC is advanced, and the intake valve closure timing is advanced in the vicinity to the bottom dead center. However, at the driving state of (6) in FIG. 13, the engine torque at the all cylinders driving is not sufficiently raised and reaches a peak. This is because the one valve stop contributes on the combustion improvement (fuel efficiency improvement) due to the intake swirl effect in the range from (1) through (6) but, in the high load region near to a full load, the intake charging efficiency (volumetric efficiency) due to the intake swirl effect is suppressed.

Therefore, in (7) exceeding CD boundary line, the one valve stop of the intake valves is stopped and switched to the operation of both of the intake valves. That is to say, when the on signal is outputted to first electromagnetic switching valve (first hydraulic pressure supply/supply stop converting means) 55 of first valve stop mechanisms 11b, 11c (two locations), limitation pins 42 are moved toward a leftward direction as viewed from is FIG. 4B so that hydraulic pressure lash adjusters 10b, 10d are changed from the lost motion operation to the valve operation state due to the lock of corresponding lash adjuster to cylinder head 1. The conversion response characteristic herein is favorable due to the conversion of only two locations.

That is to say, the higher response characteristic can be achieved than three location conversions of limitation pins 47 when change is made from (2) in FIGS. 14 to (3) in FIG. 14. Hence, accordingly, oil pump 54 which supplies the hydraulic pressure to first electromagnetic switching valve 55 can be miniaturized, or oil pump 54 itself can be abolished, and oil pump 64 which supplies the hydraulic pressure to second electromagnetic switching valve 65 can also serve as oil pump 54.

It should be noted that, if both valve drive mode is carried out with lift quantity of L3 maintained, the engine torque is abruptly increased and the opening angle of the throttle valve cannot help of being throttled. Consequently, the pump loss is increased and the fuel efficiency becomes worsened. Consequently, the lift quantity is, for example, L 3.5 between L3 and L4 and intake VTC is used to control the closure timing to the slightly retardation angle side. Thus, the intake valve closure timing can appropriately be retarded so that the abrupt increase in the engine torque is suppressed. While the pump loss is suppressed while the throttle valve is maintained at substantially full open. Thus, the worsening of the fuel efficiency in all cylinders driving•both intake valve operations can be prevented. In addition, since the intake air quantity is large under the high load state near to the full load, there is a tendency of increasing the cooling loss due to an intake air flow. However, under both intake valve operations, the intake swirl flow is decreased. Thus, the cooling loss can be reduced and the fuel efficiency can accordingly be improved.

Furthermore, if the accelerator pedal is depressed, the driving state indicates (8) in FIGS. 13 and 14 which is substantially near to a maximum torque characteristic curve.

This is achieved by controlling the lift quantity to, for example, L3 through intake VEL and by controlling the closure timing slightly toward the advance angle side through the intake VTC so that the intake valve closure timing is appropriately advanced to the vicinity to the bottom dead center. It should be noted that this advance angle quantity may be set to an advance angle quantity such as to provide a maximum charging efficiency in accordance with the engine speed. For example, in accordance with the increase in the engine speed, the advance angle quantity of the intake valves may slightly be decreased.

It should be noted that, in the driving state of (5) in FIGS. 13 and 14 slightly exceeding a BC boundary line, the working side intake valve (F side) indicates the state of maximum lift quantity L4 and the lost motion quantity at the valve stop side intake valve (R side) is a maximum of M4. Suppose, herein, a case in which the high rotation (engine speed) is resulted. At this time, as described before, a smooth lost motion behavior cannot be obtained and there is a possibility of generation of an irregular motion (behavior).

However, if this lost motion quantity is in a state of M4, the high rotation area (high engine speed area) cannot be used.

That is to say, the driving state is used at a slightly high engine speed side from the BC boundary line and a sufficient margin is provided with respect to an engine revolution limit, namely, an upper limit engine speed on which a torque curve is depicted in FIG. 13. In a region C in which the valve stop is performed and there is a possibility that the engine is revolved up to the high speed (revolution (rotation)), the maximum lift quantity reaching to the revolution limit is L3.5 as described above and this smooth lost motion quantity M3.5 maintains the smooth lost motion operation even at the revolution limit engine speed.

As described above, the effects of this embodiment have been explained for the example in which the acceleration is made in the range from (1) to (8). This example shows that the transient variation in the in-cylinder residual gas quantity (inner EGR) is suppressed by suppressing the variation in a valve overlap (an interval between the intake valve open timing and the exhaust valve closure timing) according to the intake VTC to prevent the transient combustion from being unstable.

On the other hand, it is possible to further improve the fuel efficiency using positively the valve overlap through exhaust VTC. For example, as shown in a broken line of (1) in FIG. 14, a negative large overlap is provided by performing the advance angle control for the closure timing of the exhaust valve(s) through the exhaust VTC to provide a negatively large valve overlap to and the fuel efficiency can further be improved with the residual gas to be minimized. A slight minute lift interval (called ramp) is present at a start portion of an ordinary lift curve and at an end portion thereof. Then, with the valve overlap interval (the overlap interval between the intake valve open timing and the exhaust valve closure timing) sufficiently suppressed, only the ramp interval (minute lift interval) is overlapped so that the in-cylinder residual gas is reduced. Furthermore, a phenomenon such that the combustion gas is reversely caused to flow into the intake system and re-sucked into the inside of the cylinder can be suppressed. These synergy effect can sufficiently be reduced and the fuel efficiency and the combustion stability can furthermore be improved.

It should be noted that, during the deceleration of the vehicle, the driving state is reversely changed from (8) to (1) in FIGS. 13 and 14. However, the same performance effect can be obtained in the case of the acceleration described before.

Consideration will hereinbelow be given to a switching response characteristic of the valve stop mechanisms at the time of the deceleration of the vehicle. In a case of change from (7) in FIGS. 13 and 14 to (6) in FIGS. 13 and 14, the first valve stop mechanism (two locations) is transferred to the valve stop mode. However, the limitation pins are operated according to respective return springs not according to the hydraulic pressure. Hence, the stable operations are assured and even the plurality location simultaneous operations do not generate the worsening of the response characteristic.

In the case of change from (5) to (4), the second and third valve stop mechanisms (three locations) are converted into the valve stop mode in response to the second signal hydraulic pressure and, at this time, the number of limitation pins pushed out by means of the hydraulic pressure are three which are less than four in the case of the previously proposed variably operated valve system. Thus, as described above, the switching response characteristic is improved.

In the case of the change from (3) to (2), the second and third valve stop mechanisms (three locations) transfer to the valve operation mode. However, since the limitation pins are operated according to the respective return springs not according to the hydraulic pressure. Therefore, the stable operation is assured. Furthermore, the worsening of the response characteristic even under the plural location simultaneous operations is not especially generated.

As described above, a favorable switching response characteristic of the valve stop mechanism is obtained at the time of the vehicular deceleration.

In addition, in this embodiment, one of the intake valves $3a$, $3b$ which is valve stopped state is nearer to the drive cam $5a$. This is because a spring weight of each valve spring 12 is acted upon a remote working intake valve side $3a$, $3b$ so that a large moment is stably generated in whole swing cam 7. Thus, a stabilization of the lift characteristic of each of the working side intake valves can be achieved.

[Second Embodiment]

Figure 15:
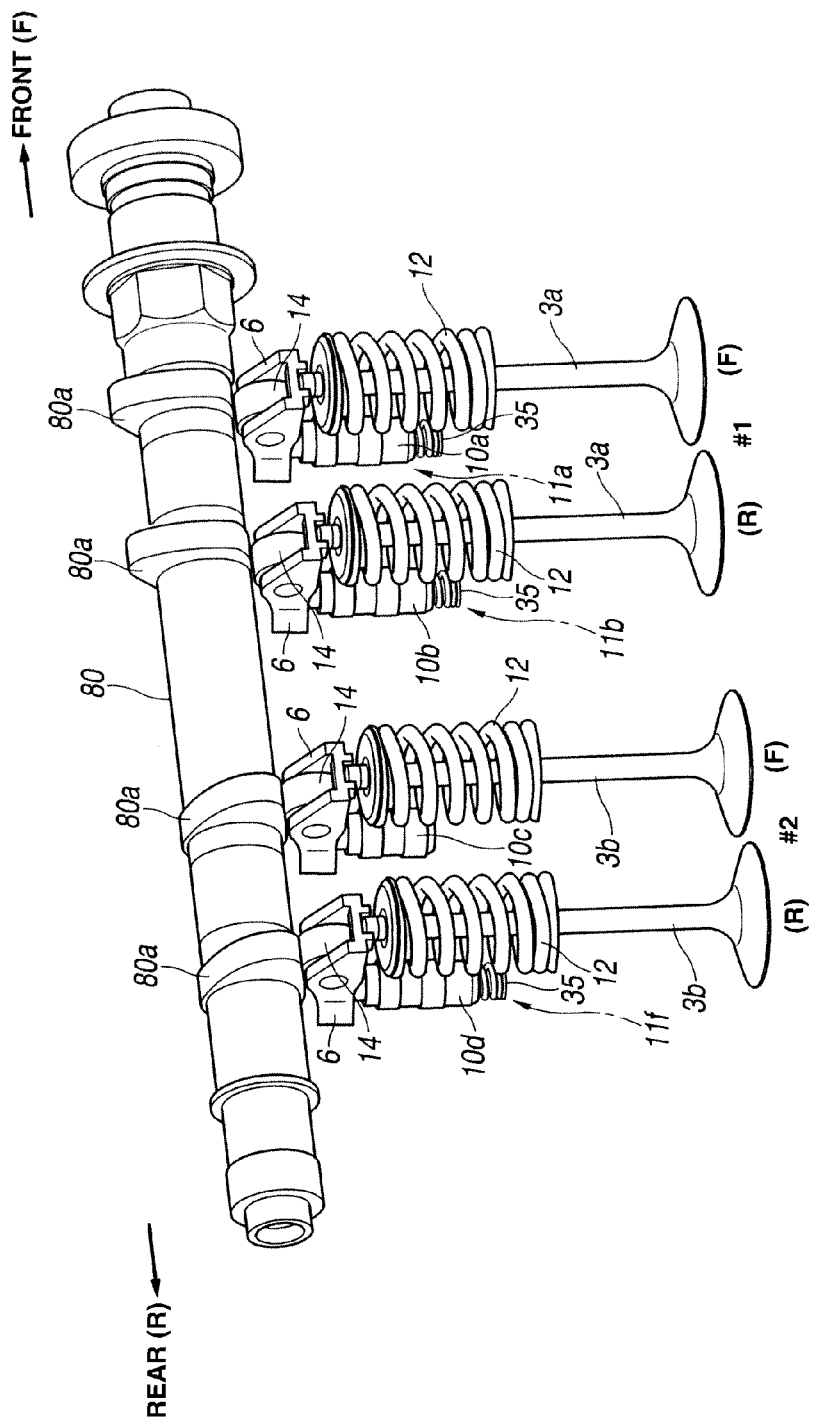
FIG. 15 is a perspective view representing the intake valve side in the variably operated valve system in a second preferred embodiment according to the present invention.

FIGS. 15 through 18 show a second embodiment according to the present invention. As shown in FIG. 15, the intake VEL is not disposed in the operated valve series of intake valve sides $3a$, $3a$, $3b$, $3b$ as is different from the first embodiment. That is to say, four intake valves $3as$, $3a$, $3b$, $3b$ in the first and second cylinders #1 and #2 cause egg shaped four rotational cams $80a$ integrally formed on an outer periphery of intake side camshaft 80 to be opened or closed via respective swing arms 6 and rollers 14.

The valve stop mechanism (R side) of intake valve $3b$ of second cylinder #2 is of the valve stop stable type in the same way as the first embodiment but is controlled by another third electromagnetic switching valve 90 different from first electromagnetic switching valve 55 which controls the first valve stop mechanism $11b$ (R side) of the intake valve of first cylinder #1 of the same valve stop stable type. Hence, although the valve stop mechanism (R side) of intake valve $3b$ at second cylinder #2 in the second embodiment is structurally the same as first valve stop mechanism $11c$ (R side) in the first embodiment (FIG. 4), the controlling electromagnetic valve is different. Therefore, in order to distinguish from the other valve stop mechanisms, the valve stop mechanism (R side) of intake valve $3b$ is called a fourth valve stop mechanism $11f$.

The operation mechanism of four exhaust valves 71a, 71a, 71b, 71b is the same as shown in FIG. 2 of the first embodiment.

Figure 16:
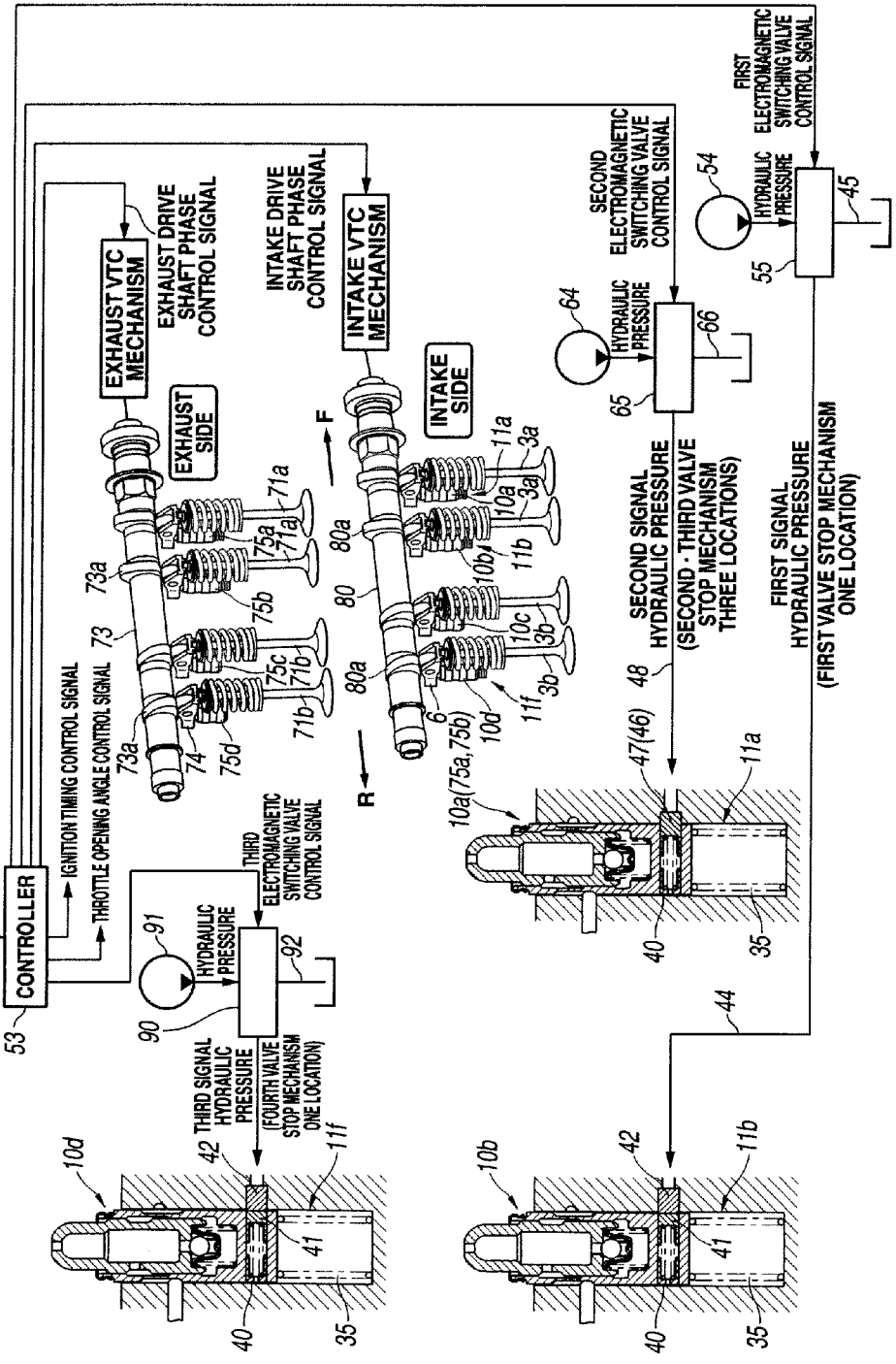
FIG. 16 is a rough view representing a control hydraulic pressure circuit in the second embodiment.

FIG. 16 shows a control system diagram. First valve stop mechanism 11b at the R side intake valve of first cylinder #1 is controlled by means of first electromagnetic switching valve 55 in the same manner as the first embodiment. However, fourth valve stop mechanism 11f of R side intake valve 3b of second cylinder #2 is controlled by means of other third electromagnetic switching valve 90. Fourth valve stop mechanism 11f of R side intake valve 3b of second cylinder #2 is of the valve stop stable type in the same way as first valve stop mechanism 11c in the first embodiment and is independently controlled by means of third electromagnetic switching valve 90 which is the other switching valve than first electromagnetic switching valve 55 which controls first valve stop mechanism 11b (R side) of first cylinder #1 of the same valve stop stable type. The hydraulic pressure from another third oil pump 91 is supplied to third electromagnetic switching valve 91.

The effect of startability in this embodiment is the same as the first preferred embodiment. A supplemental explanation will hereinafter be made.

That is to say, when the engine is stopped, each oil pump 54, 64, 91 does not generate the hydraulic pressure. Hence, first valve stop mechanism 11b and fourth valve stop mechanism 11f are in the valve mode but second valve stop mechanism 11a is in the drive (valve operation) mode.

Figure 18:
FIG. 18 is an explanatory view representing a valve lift characteristic of the intake and exhaust valves in the first and second cylinders (#1 and #2) and a throttle valve opening angle characteristic when the engine driving region is switched and transferred toward drive regions of (1) through (10) shown in FIG. 17.

Hence, as shown in the cylinder operation of (1) of FIG. 18, both intake valves 3a, 3b of one side (R side) of first and second cylinders #1, #2 are in the stopped state and the other intake and exhaust valves 3a, 3b are in the valve operation (drive) mode. That is to say, in both of the cylinders are in one intake valve mode.

Even when a cranking is started to start the engine so that a start combustion is started, the hydraulic pressure of each oil pump 54, 64, 91 is not raised and, hence, the above-described state is maintained.

In addition, since the control signals of first electromagnetic switching valve 55, second electromagnetic switching valve 65, and third electromagnetic switching valve 90 are in the off states, namely, respective signal hydraulic pressures are not the oil pump hydraulic pressures (the hydraulic pressures from the respective oil pumps) but communicated with drain passages 45, 66, 92. Thus, the respective signal hydraulic pressures are in the state acted only under low pressures. Even in a case where the hydraulic pressures of oil pumps 54, 64, 91 are raised at an earlier timing, the above-described state can be maintained.

It should, herein, be noted that the engine temperature is low at the time of engine start so that there is a possibility of a combustion failure. However, the combustion is improved due to the intake swirl generated according to the one side intake valve stop. In addition, since an engine friction is increased due to the low engine temperature, the required intake air quantity is large so that, as shown in (1) of FIG. 18, the throttle opening angle of substantially full open is demanded. It should be noted that the engine friction can be reduced according to the one valve intake valve stop described before can be reduced. Consequently, an engine start friction is reduced and the startability can be improved.

Furthermore, in this embodiment, the intake VTC of a hydraulic pressure vane type is structured to be stable at the most retardation angle side by means of the valve spring (not shown) and exhaust VTC of the hydraulic pressure vane type is structured to be stable at the most advance angle by means of the valve spring (not shown). Hence, during the start time at which no hydraulic pressure is acted, the intake and exhaust VTCs are stabilized at these positions.

Therefore, in the second embodiment, as shown in the intake and exhaust valve operations in (1) of FIG. 18, the first and second cylinders indicate the valve timings. That is to say, in this embodiment, the intake valve closure timing is in the sufficiently retardation angle side with respect to the bottom dead center. Hence, the compression and pump loss can be reduced and the startability can be improved. It should be noted that there is a possibility that the effective compression ratio is reduced and the combustion is generally worsened if the intake valve closure timing is made in the sufficiently retardation angle side with respect to the bottom dead center. However, due to the intake swirl effect described before, these problems can be avoided and further retardation angle side of the intake valve closure timing can be achieved. Hence, the compression and the pump loss can further be reduced and the start performance can furthermore be increased.

Next, during the idling drive after the warming up of the engine is completed, the friction of each part of the engine is reduced. In addition, the engine speed is suppressed than that at the time of start combustion (for example, 1000 rpm) in order to improve the fuel efficiency. Thus, as shown in an upper side of the throttle valve opening angle of (1) in FIG. 18, the throttle opening angle (of the throttle valve) is throttled to a middle opening angle.

Even under the warming up idling drive, the favorable combustion is demanded to suppress the idling rotation variation from the high quality requirement of the idling.

Hence, the control signals of first electromagnetic switching valve 53, second electromagnetic switching valve 65, and third electromagnetic switching valve 90 are continued to be off state. In other words, the same intake and exhaust valve operation states as those at the time of engine start are continued. The improvement in the combustion according to the intake swirl due to one intake valve stop and the reductions in the compression and the pump loss according to the more retardation angle side according to the one side intake vale stop cause the fuel efficiency to be improved and can contribute on the reduction in the variation of the idling rotation.

At this time, the valve timing is sufficiently retarded to a retardation angle side through the intake VTC and the intake valve open timing is also retarded so that the valve overlap is not generated and provides a negative state.

The slight minute lift interval (called ramp) is present at the start portion of the ordinary lift curve and at the end portion thereof. Then, with the valve overlap interval (the overlap interval between the intake valve open timing and the exhaust valve closure timing) sufficiently suppressed, only the ramp interval (minute lift interval) is overlapped so that the in-cylinder residual gas is reduced.

Furthermore, a phenomenon such that the combustion gas is reversely caused to flow into the intake system and re-sucked into the inside of the cylinder can be suppressed. These synergy effect can sufficiently be reduced and the fuel efficiency and the combustion stability can furthermore be improved.

It should be noted that, if the closure timing of the intake valves is in the retardation angle mode, the effective compression ratio is reduced and, in general, the combustion tends to be worsened. However, the worsening of the combustion is recovered due to the intake swirl effect and due to residual gas reduction effect or the closure timing is more retarded so that a more remarkable reduction of the compression and the pump loss can be achieved. Hence, the fuel efficiency at the time of the idling drive state is furthermore improved and the rotation variation can furthermore be reduced.

Next, various effects of the second embodiment will be described with the acceleration process ((1)⇒(2)⇒(3)⇒(4)⇒(5)⇒(6)⇒(7)⇒(8)⇒(9)⇒(10)) from the driving condition of the warming up idling shown in FIGS. 17 and 18 to the driving condition (10) in the vicinity to the maximum torque as one example.

Figure 17:
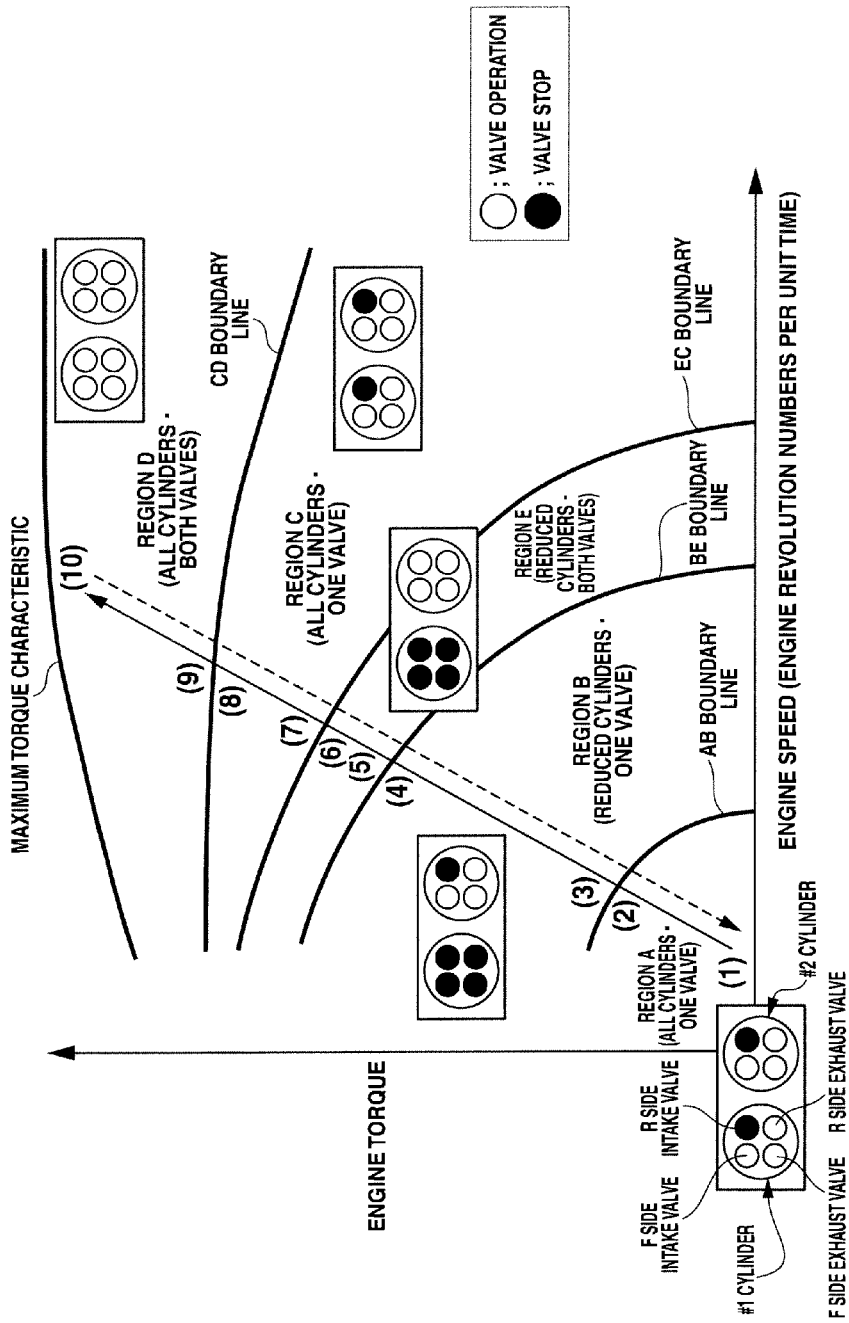
FIG. 17 is a rough view representing the valve stop drive region and the all cylinders drive region in a map between the engine speed and the engine torque in the second embodiment shown in FIG. 15.

FIG. 17 shows the working cylinder number and operating valve number map (the lateral axis denotes the engine (rotational) speed and the longitudinal axis denotes the engine torque). In region A which provides lowest engine speed and engine torque, all cylinders (#1, #2) are operated (worked) and intake valves 3a, 3a, 3b, 3b of all cylinders are in one-valve operation (intake valves 3a, 3b at the F side are driven but the intake valves 3a, 3b at the R side are valve stopped). Region B which provides a slightly higher rotation or slightly higher engine torque than region A is a region of reduced cylinder•one valve (reduced cylinder driving•one intake valve operation). That is to say, region B is one intake valve operation state. In details, for first cylinder #1, all of intake valves 3a, 3a, 71a, 71a are valve stopped so as to be a cylinder halt mode. For second cylinder #2, one intake valve operation mode is entered in which R side intake valve 3b is continuously valve stopped but intake valve 3b of F side and both exhaust valves 71b, 71b are continuously valve driven (valve operation). It should be noted that the term of reduced cylinder means that part of cylinders is in a cylinder pause mode and the remaining cylinder(s) is in the cylinder working mode.

In a region E in which the engine speed is slightly higher than region B or the engine torque is slightly higher than region B shown in FIG. 17 and which is the reduced cylinder•both valves region, first cylinder #1 is continued in the cylinder halt (pause) state and the intake valves of working second cylinder #2 are changed to both valve operated state. It should be noted that region E is not present in the first embodiment. Region C in which the engine speed is higher than region E or the engine torque is higher than region E is the all cylinders•one valve state. In other words, both of first cylinder #1 and second cylinder #2 are operated (worked) and all of intake valves of both cylinders are in one valve stopped state.

Region D in which the engine speed is higher than region C or the engine torque is higher than region C is all cylinders•both valves region (in other words, both of first and second cylinders #1 and #2 are operated but both cylinders are in all of intake and exhaust valves driven states.

In the case of the second embodiment, in region B in which the low engine speed or the low engine torque are exhibited in the reduced cylinder state, the friction reduction effect according to the one valve stop mode and the combustion improvement effect according to the intake swirl can achieve the fuel efficiency and the combustion stability in the same way as the first embodiment. Thus, the reduced cylinder state which provides a favorable fuel efficiency can be expanded to the further low rotation (engine speed)•low (engine) load side.

On the other hand, in E region in the higher engine torque or higher rotation (speed) side, both intake valve operation mode of second cylinder #1 which is at all times working permits the further improvement of the engine torque and the cylinder halt (stop) region which is favorable in the fuel efficiency can further be expanded to the high engine torque than the first embodiment. This expansion of the cylinder stop region to the high torque side is advantageous in the improvement in the fuel efficiency in terms of the total of the vehicle.

In the vehicle in which a high geared transmission is used, it is especially advantageous due to a high frequency of use of the high engine torque.

A specific explanation of the acceleration process from (1) in FIGS. 17 and 18 to (10) in FIGS. 17 and 18 will, hereinafter, be made. As shown in FIGS. 17 and 18, when the accelerator pedal is depressed from the warming up idling drive (1) state to increase the engine torque and the engine speed, the throttle valve is increased up to the approximately full open state at region of (2) in FIGS. 17 and 18.

In addition, the exhaust VTC controls the open-or-closure timing of exhaust valves 71a, 71b toward the retardation angle side. Thus, the exhaust valve open timing is retarded toward the vicinity to the bottom dead center. Consequently, a combustion pressure can effectively be converted to a piston work and, in other words, an effective expansion ratio is increased, and a cycle efficiency is increased, and the fuel efficiency is increased.

On the other hand, the valve overlap is varied from the negative valve overlap to a slightly positive valve overlap. The negative pressure within the intake manifold is decreased due to the large throttle valve opening angle. Thus, the in-cylinder residual gas is no so increased and the combustion unstability due to the residual gas is suppressed. Consequently, an influence of an increase in the effective expansion ratio becomes predominant and the fuel efficiency is accordingly further increased.

It should be noted that, during an interval between the warming up idling drive (1) and the low is rotation (engine speed) and low engine load (2), a driving region in which the engine rotation variation causes the driver to give an unpleasant feeling as the vehicle body vibration or as an unmatched feeling and a strong demand to suppress the rotation variation described above occurs. Hence, all cylinders driving in which the rotation variation is basically small is demanded. Under this presumption, as described before, the fuel efficiency is improved, and the rotation variation is suppressed according to the improvement in the combustion (combustion stabilization) due to the intake swirl at the one intake valve mode.

When the driving state exceeds AB boundary line from the driving region (2), at region (3), the mode is the reduced cylinder mode while maintaining the one intake valve mode. In other words, the on signal is supplied to second electromagnetic switching valve 65 which second and third valve stop mechanisms 11a, 11d, 11e (three locations) so that first cylinder #1 is transferred to the cylinder pause (stop) state (all of four intake and exhaust valves 3a, 3a, 71a, 71a are in the stop state)

From among four intake and exhaust valves 3a, 3a, 71a, 71a, R side intake valve is originally in the valve stop state. Hence, the valves newly transferred to the valve stop (stopped) state are only three locations (three locations). Specifically, three of second valve mechanism 11a of F side intake valve 3a of first cylinder #1, third valve mechanism 11d of F side exhaust valve 71a of second cylinder #2, and third valve stop mechanism 11e of R side exhaust valve 71a of first cylinder #1 are transferred to the valve stop state.

These valve stop mechanisms are classified into valve operation stable type valve stop mechanisms. When the signal hydraulic pressure becomes high pressure, three pins are pushed out according to the high hydraulic pressure to be transferred to the respective lost motion states so that the valve stop transfer is carried out.

Hence, the number of pins operated under the high hydraulic pressure are less than the previously proposed variably operated system (four). Hence, the oil work required for the conversion can be reduced. In addition, a transfer response characteristic to the cylinder stop (pause) can be increased since the reduction in the action hydraulic pressure is small. In addition, the intake and exhaust valves are at one time transferred to the valve stop mode. A deviation of the conversion timing of each of the intake and exhaust valves can be suppressed.

In addition, in the reduced cylinder driving state of (3) in FIG. 17, the working cylinder is maintained at the one intake valve mode as shown in FIG. 18 so that the intake swirl effect is maintained and the engine friction is more remarkably reduced since a three valve additional stop state transfer in first cylinder #1 occurs according to the reduced cylinder driving. In addition, a high load shift of the combustion at the working cylinder #2 improves the cycle efficiency and the fuel efficiency is more remarkably improved. That is to say, since an in-cylinder surface area on which the combustion gas is contacted is reduced by substantially half according to the reduced cylinder driving, the cooling loss is reduced.

In addition, the rotation variation reduction effect according to the combustion stabilization due to the intake swirl is added so that the increase in the rotation variation and the vehicle vibration due to the increase in the rotation variation according to the reduced cylinder driving can be suppressed. Consequently, the reduced cylinder driving region can be extended toward the low (engine) torque side or the low engine speed (rotation) side.

That is to say, AB boundary line in FIG. 17 is extended toward the low load•low rotation (low engine torque and/or low engine speed) side while suppressing the increase in the rotation variation and the vehicle vibration so that the total vehicle fuel efficiency can more remarkably be improved.

A supplemental explanation of the second preferred embodiment will be made.

At (3) in FIGS. 17 and 18, the intake VTC is used to control the intake valve open-or-closure timing (VTC) toward the advance angle side to a middle degree. That is to say, when the driving state is transferred to the reduced cylinder driving, the torque (load) of the working second cylinder #2 is needed to be increased by substantially twice. Therefore, to achieve this, the intake valve closure timing is advance angle controlled to the middle degree as shown in FIG. 18.

On the other hand, due to the increase in the load, a combustion strength against the in-cylinder residual gas is developed. Thus, the positive valve overlap is increased, the in-cylinder residual gas is increased (improvement in a ratio of specific heat), and the fuel efficiency can more remarkably be improved.

Then, when the accelerator pedal is further depressed to accelerate the vehicle, in order to increase the load (engine torque) of the working cylinder at (4) in FIGS. 17 and 18, the intake VTC is used to perform the valve open-or-closure timing toward the advance angle side while the throttle valve is maintained at substantially full open so that the intake valve closure timing approaches to the bottom dead center. Thus, the volumetric efficiency is increased and the reduced cylinder (mode) region is secured to the high rotation•high torque side. On the other hand, due to the further increase of the load, since the combustion strength against the in-cylinder residual gas is further developed. Thus, the positive valve overlap is further increased, the in-cylinder residual gas is further increased, and the fuel efficiency can more remarkably be improved.

However, if the engine speed•engine torque is further increased, the reduced cylinder and one intake valve driving cannot develop the engine torque demanded. In order to obtain the engine torque demanded, all time working second cylinder #2 is switched into the intake valve both valve operation (mode). In other words, the control signal to third electromagnetic switching valve 90 is turned to on (the control signal to first electromagnetic switching valve 55 is continued to be off and the control signal to second electromagnetic switching valve 65 is continued to be on) at the driving state of (5) in FIGS. 17 and 18 so that hydraulic pressure lash adjuster 10d of R side intake valve 3b of second cylinder #2 is locked and fixed to be changed to the valve operation mode and, at second cylinder #2, the operations of both intake valves 3b, 3b are switched.

At this time, the response characteristic becomes favorable and a smooth acceleration characteristic can be obtained since the switching to only one intake valve of the working cylinder (second cylinder #2) is carried out.

At the driving state of (5) in FIGS. 17 and 18, both of intake valves 3b, 3b of second cylinder #2 are valve operated. Hence, a torque abrupt increase feeling is developed if the same valve timing as driving state of (4) in FIGS. 17 and 18. To avoid this abrupt increase feeling, as shown in (5) of FIG. 18, the intake VTC is used to control the intake valves toward slightly retardation angle side and the phase is slightly advanced so that the torque abrupt increase can be suppressed.

Furthermore, the engine torque and the engine speed are raised to reach to the driving state of (6) in FIGS. 17 and 18. The intake VTC is used to perform the advance angle control up to the sufficiently advanced phase again to increase a charging efficiency to a maximum limit. On the other hand, an absolute quantity of exhaust gas is increased due to the increase in the charging efficiency. Hence, the exhaust VTC is used to perform the advance angle control up to a middle phase and an exhaust valve open timing is made at an earlier stage so that an exhaust push loss involved in the increase in the exhaust gas is reduced so as to increase the engine torque. Thus, the reduced cylinder region which provides the favorable fuel efficiency is extended toward the high engine torque or high engine speed. Consequently, the fuel efficiency of the total of the vehicle is improved.

As described above, in the vehicle in which the high geared transmission is equipped, the frequency of use of the high engine torque is increased. Hence, the further extension of the reduced cylinder region which provides the favorable fuel efficiency to the high engine torque side according to the both intake valve operation (mode) of the working cylinder is more advantageous for improvement in the fuel efficiency as the total (whole) of the vehicle.

Furthermore, when the engine torque or the engine speed is raised, the reduced cylinder mode cannot provide the engine torque demanded and is transferred to all cylinders working mode at the driving state of (7) in FIG. 17. At this time, the intake valves of the respective cylinders are transferred to the one valve stop state. That is to say, in the same way as the driving state of (1), the off signals are outputted to all of first, second, and third electromagnetic switching valves 55, 65, 90 (continued output of off signal to first electromagnetic switching valve 55, the off signal is outputted from the on signal to second electromagnetic switching valve 65, and the off signal is outputted from the on signal to third electromagnetic switching valve 90). In details, the off signal is outputted to second electromagnetic switching valve 65, second and third valve stop mechanisms 11a, 11d, 11e (three locations) are converted to the valve operation mode, and the off signal is outputted to third electromagnetic switching valve 90 so that fourth valve stop mechanism 11f is converted to the valve stop mode.

The conversion of these four valve stop mechanisms are not the conversion operation according to the hydraulic pressure but the operation according to the return spring forces.

Hence, even if second and third electromagnetic switching valves 65, 90 are simultaneously operated and these four valve stop mechanisms are simultaneously converted into the above-described modes, a worsening of the response characteristic according to such a plurality simultaneous conversion is not specially present and the conversion operation becomes stable. Hence, the switching response characteristic becomes favorable and the smooth acceleration performance is obtained.

It should be noted that, since the driving state is switched from the reduced cylinder driving to all cylinders driving, the engine torque is rapidly increased. Hence, the intake VTC causes the valve open-or-closure timing to be retardation angle control to a middle degree to suppress the rapid increase of the torque. Thus, even if the engine driving state is in the middle or high torque region, the high efficient combustion and fuel can be achieved.

Furthermore, when the engine torque or the engine speed (engine rotation) are increased and the driving state reaches (8) in FIG. 17, the intake VTC is used to control the intake valve timing toward a slightly advance angle side to increase the engine torque, in order to increase the charging efficiency.

When the rotation•torque (the engine speed or the engine torque) is increased, even under the all cylinders working (operation) drive, the one valve driving of the intake valves cannot provide the engine torque demanded.

Therefore, at the driving state of (9) in FIG. 17, both of first and second cylinders #1 and #2 are switched for both of intake valves of the individual cylinders to be operated. That is to say, first valve stop mechanism 11*b* at the R side and fourth valve stop mechanisms at the R side are converted to the valve operation state. It should, herein, be noted that the locations at which the push out work of limitation pins 42 according to the signal hydraulic pressure are carried out are only the intake valve (first valve stop mechanism 11*b*) at the R side of first cylinder #1 and the intake valve at the R side of second cylinder #2 (fourth valve stop mechanism 11*f*). Hence, the switching response characteristic is favorable and the smooth acceleration performance is achieved.

It should, herein, be noted that, as shown in FIG. 16, oil pump 91 is additionally (separately) disposed which supplies hydraulic pressure to third electromagnetic switching valve 90 (fourth valve stop mechanism 11*f*). However, oil pump 54 which supplies the hydraulic pressure to first electromagnetic switching valve 55 (first valve stop mechanism 11*b*) may serve as oil pump 91. In the former case, the switching response characteristic of the respective valve stop mechanisms are improved but, in the latter case, the engine system is simplified.

In addition, when the cylinders are in the both valve operations, the engine torque is rapidly increased so that intake VTC is used to retard the valve open-or-closure timing to a more retardation angle side to the middle degree to suppress the torque rapid increase.

Then, when the accelerator pedal is depressed more deeply, the driving state reaches (10) in FIG. 17 which is approximately near to the maximum torque characteristic line. At this time, the intake valve closure timing is appropriately advance angle controlled up to the proximity to bottom dead center and the advance angle quantity may be set to the maximum charging efficiency in accordance with the engine rotation (engine speed).

Next, the switching response characteristics of the respective valve stop mechanisms will be considered at the time of the vehicular deceleration. The switching response characteristics are basically the same as those in the case of the first embodiment. Hence, a particular section of the second embodiment will be supplementally explained.

The driving state is changed from (7) to (6) in FIG. 17. At this time, second and third valve stop mechanisms of first cylinder #1 (three movement pins) are simultaneously transferred by means of the signal hydraulic pressure from second electromagnetic switching valve 65 to the valve stop mode. This case is more advantageous than the previously proposed variably operated valve system described in the BACKGROUND OF THE INVENTION (four movement pins) in terms of the response characteristic.

On the other hand, fourth valve stop mechanism of first cylinder #1 (one movement pin) is transferred to the valve operation (state) in response to the signal hydraulic pressure from third electromagnetic switching valve 90 (fourth valve stop mechanism 11*f*). However, oil pump 91 which supplies the hydraulic pressure to third electromagnetic switching valve 90 is an exclusive use oil pump only for third electromagnetic switching valve 90. Therefore, no influence is given to the switching response characteristics for second and third electromagnetic switching valves (three movement pins).

In a case where the driving state is changed from (5) to (4), fourth valve stop mechanism 11*f* (one movement pin) is transferred to the valve operation (mode) by means of the corresponding return spring in response to the off state of the signal hydraulic pressure of the third electromagnetic switching valve so that a favorable response characteristic can be achieved.

As described hereinabove, the present invention has been described in terms of the first and second embodiments.

Various performances such as the start performance and fuel efficiency performance are increased. In addition, the conversion response characteristics of the valve stop mechanisms at the especially important acceleration process can be increased and the conversion characteristics during the deceleration process can be increased.

In each of the first and second embodiments, the switching energy is the hydraulic pressure. Thus, a plurality of hydraulic pressure passages are disposed at downstream sides of the respective electromagnetic switching valves so that a plurality of valve stop mechanisms can at one time and simultaneously be converted. These are advantageous in each of the first and second embodiments.

In addition, in each of the first and second embodiments, a plurality of oil pumps are disposed which supply the respective hydraulic pressures to the corresponding valve stop mechanisms. However, a single oil pump may be used for the respective valve stop mechanisms, in place of the above-described oil pumps.

On the other hand, the switching energy is an electromagnetic force in place of the hydraulic pressure and the movements of the respective limitation pins (movement pins) of the respectively corresponding valve stop mechanisms may directly be controlled according to on-or-off operation of, for example, electromagnetic solenoid valves and the return springs.

In this case, the difference between the valve stop stable type and the valve operation stable type are only whether the lash adjusters are in the lost motion states or in the cylinder head fixed state in a case where the return spring pushes the limitation pins as in the same case as the hydraulic pressure. The electromagnetic force type can easily be embodied.

As described above, in a case where the electromagnetic force is, for example, used for the switching energy, a smooth conversion operation can be obtained even when the engine driving state is in an extremely low rotation (including the engine stop) of the engine or in an extremely cold state in both of which the hydraulic pressure energy is not easily obtained from the oil pumps.

In addition, as an example of these valve stop mechanisms, these valve stop mechanisms are disposed in the hydraulic pressure lash adjusters which provide the fulcrums of the swing arms and hydraulic lash adjusters are slid in the retaining holes of cylinder head 1. However, collars each being made of an iron series material, are intervened in the retaining holes and the lash adjusters may be slid within the collars.

Thus, even if cylinder head 1 is made of aluminum material or magnesium material, a wear and abrasion resistance can be improved.

In addition, it is possible to provide other positions than the hydraulic pressure lash adjusters which are the fulcrums of the swing arms for the valve stop mechanisms.

For example, the lost motion mechanism may be disposed within the inner side of the swing arm. In this case, as shown in a Japanese Patent Application Publication (tokuhyou) 2009-0503345 published on Jan. 29, 2009, a roller element which can be displaced to a main swing arm (lost motion) may be disposed and the valve stop mechanism such as to switch the engagement of the roller element with the main swing arm or disengagement of the roller element from the main swing arm may be used.

The present invention is applicable to various structures in a range without department from a gist of the present invention. For example, the present invention is applicable to a lifter type variably operated valve mechanism which has no hydraulic pressure lash adjuster(s) as described in a Japanese Patent Application Publication (tokkai) No. 2010-270633 published on Dec. 2, 2010. In this case, the valve stop mechanism incorporated into the lifter as described in a Japanese Patent Application Publication No. Showa 63-16112 published on Jan. 23, 1988 may be used.

In addition, in each of the first and second embodiment, an example of the series two cylinder engine has been described. However, it is possible to be expanded to a series four cylinder engine with its constituent element multiplied by twice to be expanded to a series six cylinder engine with its constituent element multiplied by third times. Furthermore, the constituent elements in the case of the series six cylinder engine are divided into two banks, one bank in the cylinder may be a cylinder stoppable cylinders, and the other bank may be the working cylinders at all times. In this case, in the cylinder stoppable cylinders, the intake valve side is transferred to the valve stop (mode) by means of the corresponding valve stop mechanism in the same way as each of the first and second embodiment and the exhaust valve side may achieve the substantial cylinder stop state by advancing a peak lift phase of the exhaust VTC to the vicinity to the bottom dead center as shown in a Japanese Patent Application first Publication No. 2011-117399 published on Jun. 16, 2011.

Technical ideas of the invention graspable from the embodiments will, hereinafter, be described.

[Claim a]

The variably operated valve system for the multi-cylinder internal combustion engine as claimed in claim 1, wherein the pair of exhaust valves is disposed for each of the cylinders, the variably operated valve system further comprises: a third valve stop mechanism configured to switch between the valve operation state in which the pair of exhaust valves of the part of the cylinders are operated to be open or closed and the valve stopped state in which the open-or-closure operation of the pair of exhaust valves is stopped, the third valve stop mechanism is configured to be in the valve stopped state when the switching energy is supplied and to be in the valve operation state when the supply of the switching energy is stopped, and the third valve stop mechanism is configured to make the pair of exhaust valves of the part of the cylinders in the valve stopped state when the second valve stop mechanism makes the other of the pair of intake valves of the part of the cylinders in the valve stopped state.

According to the [claim a] described above, since, during the transition (or transfer) of the engine state to the cylinder halt (stopped) state, the pair of exhaust valves are simultaneously closed in addition to the other one of the pair of intake valves, a deviation in a timing of an operation stop between the intake valves and the exhaust valves when the part of the cylinders is transferred to the cylinder halt (stopped) state can be suppressed.

[Claim b]

The variably operated valve system for the multi-cylinder internal combustion engine as set forth in [claim a], wherein the first valve stop mechanism switches the one of the pair of the intake valves between the valve operation state and the valve stopped state for all of the cylinders.

According to the present invention described in [claim b], since the intake valves of all cylinders can be in the one valve stopped state from the time at which the engine is started, the large friction can be obtained and, in this addition, the combustion improvement effect according to the intake swirl can be obtained for all of the cylinders. Consequently, a more favorable startability can be obtained.

[Claim c]

The variably operated valve system for the multi-cylinder engine as set forth in [claim b], wherein the variably operated valve system further comprises: an all cylinders drive one intake valve operation region in which the supply of the switching energy to the first valve stop mechanism, the second valve stop mechanism, and the third valve stop mechanism is stopped; a reduced cylinder drive one intake valve operation region in which the supply of the switching energy to the first valve stop mechanism is stopped and the supply of the switching energy to the second valve stop mechanism and to the third valve stop mechanism is carried out; and an all cylinders drive intake both valve operation region in which the switching energy to the first valve stop mechanism is supplied and the supply of the switching energy to the second valve stop mechanism and to the third valve stop mechanism is stopped.

According to the present invention described in [claim c], in both of all cylinders drive state and reduced cylinder drive state, the combustion can be improved according to the intake swirl. Due to this effect, the reduced cylinder drive region can be extended toward the low engine torque side and/or the low engine speed side by especially suppressing an engine rotation variation (a bottleneck in a restriction of the reduced cylinder drive) in the low engine torque side and/or the low engine speed side region so that the fuel consumption (economy) of the whole vehicle can be improved.

[Claim d]

The variably operated valve system for the multi-cylinder engine as set forth in [claim a], wherein the variably operated valve system further comprises a fourth valve stop mechanism disposed to switch one of the pair of intake valves of a remaining cylinder except the part of the plurality of cylinders between the valve operation state and the valve stopped state and the fourth valve stop mechanism is configured to make the one of the pair of intake valves in the valve operation state when the switching energy is supplied and to make the one of the pair of intake valves in the valve stopped state when the supply of the switching energy is stopped.

According to the present invention described in [claim d], since all cylinders are in the one intake valve stopped mode from the time at which the engine is started, the effect of the reduction in the engine friction and combustion improvement effect according to the intake swirl can be obtained for all cylinders. Thus, the favorable startability can be achieved. In addition, in the reduced cylinder drive region, the working cylinder can be selected to both of the intake valve both valve operation mode and the intake valve one valve operation mode. Consequently, in the low engine torque side and/or low engine speed side in the reduced cylinder drive region, the friction reduction effect according to the one intake valve stopped mode and the more favorable fuel consumption (efficiency) according to the intake swirl can be achieved. In addition, combustion stabilization and rotation variation suppression effects according to the one valve stop can extend the reduced cylinder region which gives the favorable fuel consumption to the lower engine torque side and/or the lower engine speed side. Furthermore, at the high engine torque side and/or the high engine speed side in the reduced cylinder drive region, the improvement of the engine torque can be achieved according to the intake valve both valve operation mode. Thus, the reduced cylinder region can be extended to the higher engine torque side and/or the higher engine speed side. Consequently, the fuel consumption of the whole vehicle can more remarkably be improved.

[Claim e]

The variably operated valve system for the multi-cylinder engine as set forth in [claim d], wherein the variably operated valve system further comprises: an all cylinders drive one intake valve operation region in which the supply of the switching energy to the first valve stop mechanism, the second valve stop mechanism, the third valve stop mechanism, and the fourth valve stop mechanism is stopped; a reduced cylinder drive one intake valve operation region in which the supply of the switching energy to the first valve stop mechanism and to the fourth valve stop mechanism is stopped is stopped and the supply of the switching energy to the second valve stop mechanism and the third valve stop mechanism is carried out; a reduced cylinder drive both intake valve operation region in which the supply of the switching energy to the first valve stop mechanism is stopped and the supply of the switching energy to the second valve stop mechanism, the third valve stop mechanism, and the fourth valve stop mechanism is carried out; and an all cylinders drive both intake valve operation region in which the supply of the switching energy to the first valve stop mechanism and the fourth valve stop mechanism is carried out and the supply of the switching energy to the second valve stop mechanism and the third valve stop mechanism is stopped.

According to the present invention described in [claim e], the same action and effect as the claim d can be achieved.

[Claim f]

The variably operated valve system for the multi-cylinder internal combustion engine as set forth in [claim a], wherein the switching energy is a hydraulic pressure energy.

According to the present invention described in [claim f], since a plurality of hydraulic pressure passages are branched at the downstream of hydraulic pressure supply/supply stop conversion means which is the switching energy supply/supply stop conversion means, the stop mechanism of the plurality of valves can at one time be converted, the structure is not complicated and the deviation of the timing among the valve stop mechanisms is not easily generated.

[Claim g]

The variably operated valve system for the multi-cylinder internal combustion engine as set forth in either [claim c] or [claim e], wherein the variably operated valve system is capable of varying a phase or a lift quantity in lift characteristics of each of the intake valves and the exhaust valves.

According to the present invention described in [claim g], the improvement of various performances according to the combinations of the valve stop and the valve operation can more remarkably be increased utilizing the valve timing control apparatus (VTC) and the valve event and lift varying mechanism (VEL).

[Claim h]

The variably operated valve system for the multi-cylinder internal combustion engine as set forth in [claim f], wherein the intake valves and the exhaust valves are operated to be open or closed by means of swing arms with lash adjusters as swing fulcrums and the first valve stop mechanism, the second valve stop mechanism, and the third valve stop mechanism are constituted by lost motion mechanisms which make the lash adjusters movable to absorb swing quantities of the respective swing arms and to be in the valve stopped state.

[Claim i]

The variably operated valve system for the multi-cylinder internal combustion engine as set forth in [claim h], wherein each of the first valve stop mechanism, the second valve stop mechanism, and the third valve stop mechanism comprises: a retaining hole which movably retains a corresponding one of the lash adjusters in an axial direction of the corresponding one of the lash adjuster; a spring biased to bring the corresponding one of the lash adjusters in contact with a corresponding one of the swing arms; first engagement mechanism and second engagement mechanism, by means of each of which the corresponding one of the lash adjusters is stopped in an engaged state at a predetermined position of the retaining hole.

[Claim j]

The variably operated valve system for the multi-cylinder internal combustion engine as set forth in [claim i], wherein the first engagement mechanism with which the first valve stop mechanism is provided includes: a first pin which is capable of being retained in an axial right angle direction within the corresponding one of the lash adjusters; a first pin spring biasing the first pin toward a peripheral wall side of the retaining hole; a first fitting hole to which the first pin is fitted within the peripheral wall of the retaining hole; and an oil passage supplying the hydraulic pressure to an inner periphery of the first fitting hole, in a case where the hydraulic pressure is not supplied to the first fitting hole, the whole of the first pin is housed within the first fitting hole and each of the lash adjusters is set to be movable within the retaining hole.

[Claim k]

The variably operated valve system for the multi-cylinder internal combustion engine as set forth in [claim i], wherein the second engagement mechanism with which the second valve stop mechanism and the third valve stop mechanism are provided includes: a second pin slidably retained within a sliding hole in the axial right angle direction of the corresponding one of the lash adjusters; a second pin spring biasing the second pin toward a peripheral wall side of the retaining hole; and an oil passage supplying the hydraulic pressure toward the inner periphery of the second fitting hole and wherein, in a case where the hydraulic pressure is not supplied to the second fitting hole, the second pin is arranged over the second fitting hole and the sliding hole within the corresponding one of the lash adjusters to set the corresponding one of the lash adjusters to be moveable within the retraining hole.

[Claim l]

The variably operated valve system for the multi-cylinder internal combustion engine as set forth in [claim c], wherein, during a start of the engine or an idling drive, the all cylinders drive one intake valve operation region is applied.

According to the present invention described in [claim l], even if the effective compression ratio is low, the intake swirl is developed according to the intake valve one valve stop (one valve operation). Thus, the favorable combustion is carried out. Furthermore, an explosion interval according to the all cylinders drive can be shortened and the engine friction reduction according to the one intake valve stop can obtain the favorable startability. In addition, during the idle driving, the fuel consumption can become favorable and the engine rotation variation can be reduced.

[Claim m]

The variably operated valve system for the multi-cylinder internal combustion engine as set forth in [claim g], wherein, during a start of the engine or during an idle driving, a closure timing of each of the exhaust valves is varied toward an advance angle side.

According to the present invention described in [claim m], the closure timing of the exhaust valve is advanced at the time of the engine start. Thus, the valve overlap interval between the open timing of the intake valve(s) and the closure timing of the exhaust valve(s) is suppressed and the valve overlap is carried out by only the ramp interval (a minute lift interval). Furthermore, according to the intake valve one valve stop, such a phenomenon that the combustion gas is reversely flowed into the intake system of the engine and again sucked into the corresponding cylinder can be suppressed. A synergism effect of these ramp interval overlap and suppression can sufficiently reduce the in-cylinder residual gas and the combustion stability can more remarkably be improved.

[Claim n]

The variably operated valve system for the multi-cylinder internal combustion engine as set forth in [claim l], wherein the variably operated valve system includes the reduced cylinder drive one intake valve operation region, the all cylinders drive one intake valve operation region, and the all cylinders drive intake both valve operation region sequentially in accordance with an increase in an engine speed and/or an engine torque from the all cylinders drive one intake valve operation region during the engine start or during the idling drive.

[Claim o]

The variably operated valve system for the multi-cylinder internal combustion engine as set forth in [claim e], wherein the variably operated valve system includes: the all cylinders drive one intake valve operation region, the reduced cylinder drive one intake valve operation region, the reduced cylinder intake both valve operation region, the all cylinders one intake valve operation region, the all cylinders drive one intake valve operation region, and the all cylinders drive intake both valve operation region sequentially in accordance with an increase in an engine torque and/or an engine speed from an engine driving state of an engine start or an idling drive.

[Claim p]

The variably operated valve system for the multi-cylinder is internal combustion engine as claimed in [claim h], wherein the first valve stop mechanism is disposed on one of the swing arms corresponding to one of the pair of intake valves of the part of the cylinders and one of the pair of intake valves of the other of the cylinders than the part of the cylinders, the second valve stop mechanism is disposed on one of the swing arms corresponding to the other of the pair of intake valves of the part of the cylinders, and the third valve stop mechanism is disposed on one of the swing arms corresponding to the pair of exhaust valves of the part of the cylinders.

[Claim q]

The variably operated valve system for the multi-cylinder internal combustion engine as set forth in [claim p], wherein a plurality of hydraulic pressure passages are branched at a downstream side of hydraulic pressure supply/supply stop conversion means and each of the hydraulic pressure passage is linked to the second valve stop mechanism at an intake side or to the third valve stop mechanism at an exhaust side.

According to the present invention described in claim q, the intake valve(s) and the exhaust valve(s) can, at one time, be valve stopped.

This application is based on a prior Japanese Patent Application No. 2013-007998 filed in Japan on Jan. 21, 2013. The entire contents of this Japanese Patent Application No. 2013-007998 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A variably operated valve system for a multi-cylinder internal combustion engine, the internal combustion engine having a plurality of cylinders, comprising:
   a pair of intake valves and a pair of or a single exhaust valve disposed for each of the cylinders;
   a first valve stop mechanism configured to switch between a valve operation state in which one of the pair of intake valves from among the pair of intake valves of a part of the cylinders is operated to be open or closed and a valve stopped state in which a valve open-or-closure operation of the one of the pair of intake valves is stopped; and
   a second valve stop mechanism configured to switch between a valve operation state in which the other of the pair of intake valves from among the pair of intake valves of the part of the cylinders is operated to be open or closed and the valve stopped state in which the valve open-or-closure operation is stopped,
   wherein the first valve stop mechanism is configured to be in the valve operation state when a switching energy is supplied and to be in the valve stopped state when a supply of the switching energy is stopped and the second valve stop mechanism is configured to be in the valve stopped state when the switching energy is supplied and to be in the valve operation state when the supply of the switching energy is stopped,
   wherein, during a start of the engine, the supply of the switching energy to the first valve stop mechanism and the second valve stop mechanism is stopped.

2. A variably operated valve system for a multi-cylinder internal combustion engine, the internal combustion engine having a plurality of cylinders, comprising:
   a pair of intake valves and a pair of or a single exhaust valve disposed for each of the cylinders;
   swing arms configured to swing with lash adjusters as swing fulcrums to actuate the pair of intake valves and the pair of or single exhaust valve to perform open-or-closure operations;
   a first valve stop mechanism actuated by a hydraulic pressure to make a swing quantity of one of the swing arms corresponding to one of the pair of intake valves of a part of the cylinders from among the plurality of cylinders a lost motion to be in a valve stopped state; and
   a second valve stop mechanism actuated by the hydraulic pressure to make a swing quantity of another of the swing arms corresponding to the other of the pair of intake valves of the part of the cylinders from among the plurality of cylinders the lost motion to be in the valve stopped state, wherein the first valve stop mechanism is configured to be in a valve operation state when a hydraulic pressure is supplied and to be in the valve stopped state when a supply of the hydraulic pressure is limited and the second valve stop mechanism is configured to be in the valve stopped state when the hydraulic pressure is supplied and to be in the valve operation state when the supply of the hydraulic pressure is limited, wherein, during a start of the engine, a supply of the switching energy to the first valve stop mechanism and the second valve stop mechanism is stopped.

3. A control apparatus of a variably operated valve system for a multi-cylinder internal combustion engine, comprising:

a pair of intake valves and a pair of or a single exhaust valve respectively disposed for each of a plurality of cylinders;

a first valve stop mechanism configured to switch between a valve operation state in which one of the pair of intake valves from among the pair of intake valves of a part of the cylinders is operated to be open or closed and a valve stopped state in which a valve open-or-closure operation is stopped; and a second valve stop mechanism configured to switch between the valve operation state in which the other of the pair of intake valves from among the pair of intake valves of the part of the cylinders is operated to be open or closed and the valve stopped state in which the valve open-or-closure operation of the other of the pair of intake valves is stopped, wherein the first valve stop mechanism is configured to operate the one of the pair of intake valves when a switching energy is supplied and to stop the valve open-or-closure operation of the one of the pair of intake valves when a supply of a switching energy is carried out, the second valve stop mechanism is configured to stop the operation of the other of the pair of intake valves when the supply of the switching energy is stopped, and the supply of the switching energy to the first valve stop mechanism and to the second valve stop mechanism is separately controlled, wherein, during a start of the engine, the supply of the switching energy to the first value stop mechanism and the second valve stop mechanism is stopped.

4. The variably operated valve system for the multi-cylinder internal combustion engine as claimed in claim 1, wherein the pair of exhaust valves is disposed for each of the cylinders, the variably operated valve system further comprises: a third valve stop mechanism configured to switch between a valve operation state in which the pair of exhaust valves of the part of the cylinders are operated to be open or closed and a valve stopped state in which the open-or-closure operation of the pair of exhaust valves is stopped, the third valve stop mechanism is configured to be in the valve stopped state when the switching energy is supplied and to be in the valve operation state when the supply of the switching energy is stopped, and the third valve stop mechanism is configured to cause the pair of exhaust valves of the part of the cylinders to be in the valve stopped state when the second valve stop mechanism causes the other of the pair of intake valves of the part of the cylinders to be in the valve stopped state.

5. The variably operated valve system for the multi-cylinder internal combustion engine as claimed in claim 4, wherein the first valve stop mechanism switches the one of the pair of the intake valves between the valve operation state and the valve stopped state for all of the cylinders.

6. The variably operated valve system for the multi-cylinder engine as claimed in claim 5, wherein the variably operated valve system further comprises:

an all cylinders drive one intake valve operation region in which the supply of the switching energy to the first valve stop mechanism, the second valve stop mechanism, and the third valve stop mechanism is stopped;

a reduced cylinder drive one intake valve operation region in which the supply of the switching energy to the first valve stop mechanism is stopped and the supply of the switching energy to the second valve stop mechanism and to the third valve stop mechanism is carried out; and an all cylinders drive both intake valve operation region in which the switching energy to the first valve stop mechanism is supplied and the supply of the switching energy to the second valve stop mechanism and to the third valve stop mechanism is stopped.

7. The variably operated valve system for the multi-cylinder engine as claimed in claim 4, wherein the variably operated valve system further comprises a fourth valve stop mechanism disposed to switch one of the pair of intake valves of a remaining cylinder except the part of the plurality of cylinders between the valve operation state and the valve stopped state and the fourth valve stop mechanism is configured to cause the one of the pair of intake valves to be in the valve operation state when the switching energy is supplied and to cause the one of the pair of intake valves to be in the valve stopped state when the supply of the switching energy is stopped.

8. The variably operated valve system for the multi-cylinder engine as claimed in claim 7, wherein the variably operated valve system further comprises:

an all cylinders drive one intake valve operation region in which the supply of the switching energy to the first valve stop mechanism, the second valve stop mechanism, the third valve stop mechanism, and the fourth valve stop mechanism is stopped;

a reduced cylinder drive one intake valve operation region in which the supply of the switching energy to the first valve stop mechanism and to the fourth valve stop mechanism is stopped is stopped and the supply of the switching energy to the second valve stop mechanism and the third valve stop mechanism is carried out;

a reduced cylinder drive both intake valve operation region in which the supply of the switching energy to the first valve stop mechanism is stopped and the supply of the switching energy to the second valve stop mechanism, the third valve stop mechanism, and the fourth valve stop mechanism is carried out; and an all cylinders drive both intake valve operation region in which the supply of the switching energy to the first valve stop mechanism and the fourth valve stop mechanism is carried out and the supply of the switching energy to the second valve stop mechanism and the third valve stop mechanism is stopped.

9. The variably operated valve system for the multi-cylinder internal combustion engine as claimed in claim 4, wherein the switching energy is a hydraulic pressure energy.

10. The variably operated valve system for the multi-cylinder internal combustion engine as claimed in claim 6, wherein the variably operated valve system is capable of varying a phase or a lift quantity in lift characteristics of each of the intake valves and the exhaust valves.

11. The variably operated valve system for the multi-cylinder internal combustion engine as claimed in claim 9, wherein the intake valves and the exhaust valves are operated to be open or closed by swing arms with lash adjusters as swing fulcrums and the first valve stop mechanism, the second valve stop mechanism, and the third valve stop mechanism are constituted by lost motion mechanisms which make the lash adjusters movable to absorb swing quantities of the respective swing arms and to be in the valve stopped state.

12. The variably operated valve system for the multi-cylinder internal combustion engine as claimed in claim 11, wherein each of the first valve stop mechanism, the second valve stop mechanism, and the third valve stop mechanism comprises: a retaining hole which movably retains a corresponding one of the lash adjusters in an axial direction of the corresponding one of the lash adjusters; a spring biased to bring the corresponding one of the lash adjusters in contact with a corresponding one of the swing arms; a first engagement mechanism and a second engagement mechanism, via each of which the corresponding one of the lash adjusters is stopped in an engaged state at a predetermined position of the retaining hole.

13. The variably operated valve system for the multi-cylinder internal combustion engine as claimed in claim 12, wherein the first engagement mechanism with which the first valve stop mechanism is provided includes: a first pin which is capable of being retained in an axial right angle direction within the corresponding one of the lash adjusters; a first pin spring biasing the first pin toward a peripheral wall side of the retaining hole; a first fitting hole to which the first pin is fitted within the peripheral wall of the retaining hole; and an oil passage supplying the hydraulic pressure to an inner periphery of the first fitting hole, in a case where the hydraulic pressure is not supplied to the first fitting hole, the whole of the first pin is housed within the first fitting hole and each of the lash adjusters is set to be movable within the retaining hole.

14. The variably operated valve system for the multi-cylinder internal combustion engine as claimed in claim 12, wherein the second engagement mechanism with which the second valve stop mechanism and the third valve stop mechanism are provided includes: a second pin slidably retained within a sliding hole in the axial right angle direction of the corresponding one of the lash adjusters; a second pin spring biasing the second pin toward the peripheral wall side of the retaining hole; and an oil passage supplying the hydraulic pressure toward the inner periphery of the second fitting hole and wherein, in a case where the hydraulic pressure is not supplied to the second fitting hole, the second pin is arranged over the second fitting hole and the sliding hole within the corresponding one of the lash adjusters to set the corresponding one of the lash adjusters to be movable within the retraining hole.

15. The variably operated valve system for the multi-cylinder internal combustion engine as claimed in claim 6, wherein, during a start of the engine or an idling drive, the all cylinders drive one intake valve operation region is applied.

16. The variably operated valve system for the multi-cylinder internal combustion engine as claimed in claim 10, wherein, during a start of the engine or during an idle driving, a closure timing of each of the exhaust valves is varied toward an advance angle side.

17. The variably operated valve system for the multi-cylinder internal combustion engine as claimed in claim 15, wherein the variably operated valve system includes the reduced cylinder drive one intake valve operation region, the all cylinders drive one intake valve operation region, and the all cylinders drive both intake valve operation region sequentially in accordance with an increase in an engine speed and/or an engine torque from the all cylinders drive one intake valve operation region during the engine start or during the idling drive.

18. The variably operated valve system for the multi-cylinder internal combustion engine as claimed in claim 8, wherein the variably operated valve system includes: the all cylinders drive one intake valve operation region, the reduced cylinder drive one intake valve operation region, the reduced cylinder both intake valve operation region, the all cylinders one intake valve operation region, the all cylinders drive one intake valve operation region, and the all cylinders drive both intake valve operation region sequentially in accordance with an increase in an engine torque and/or an engine speed from an engine driving state of an engine start or an idling drive.

19. The variably operated valve system for the multi-cylinder internal combustion engine as claimed in claim 11, wherein the first valve stop mechanism is disposed on one of the swing arms corresponding to one of the pair of intake valves of the part of the cylinders and one of the pair of intake valves of the other of the cylinders than the part of the cylinders, the second valve stop mechanism is disposed on one of the swing arms corresponding to the other of the pair of intake valves of the part of the cylinders, and the third valve stop mechanism is disposed on one of the swing arms corresponding to the pair of exhaust valves of the part of the cylinders.

20. The variably operated valve system for the multi-cylinder internal combustion engine as claimed in claim 19, wherein a plurality of hydraulic pressure passages are branched at a downstream side of a hydraulic pressure supply/supply stop conversion member and each of the hydraulic pressure passage is linked to the second valve stop mechanism at an intake side or to the third valve stop mechanism at an exhaust side.

\* \* \* \* \*